(12) United States Patent
Sakurai et al.

(10) Patent No.: US 12,276,748 B2
(45) Date of Patent: Apr. 15, 2025

(54) RADAR DEVICE AND BRACKET FOR RADAR DEVICE

(71) Applicant: DENSO CORPORATION, Kariya (JP)

(72) Inventors: Kazumasa Sakurai, Nisshin (JP); Toshiya Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 597 days.

(21) Appl. No.: 17/495,261

(22) Filed: Oct. 6, 2021

(65) Prior Publication Data

US 2022/0026522 A1 Jan. 27, 2022

Related U.S. Application Data

(63) Continuation of application No. PCT/JP2020/015868, filed on Apr. 8, 2020.

(30) Foreign Application Priority Data

Apr. 8, 2019 (JP) .................................. 2019-073423

(51) Int. Cl.
| | |
|---|---|
| *G01S 7/02* | (2006.01) |
| *G01S 7/03* | (2006.01) |
| *G01S 13/93* | (2020.01) |
| *G01S 13/931* | (2020.01) |
| *H01Q 15/18* | (2006.01) |

(52) U.S. Cl.
CPC ............... *G01S 7/027* (2021.05); *G01S 7/03* (2013.01); *G01S 13/931* (2013.01); *H01Q 15/18* (2013.01)

(58) Field of Classification Search
CPC . G01S 2013/93271; G01S 2013/93275; G01S 7/028; G01S 7/027; G01S 7/03; G01S 13/931; H01Q 15/18; H01Q 1/3233; H01Q 21/065; H01Q 19/18
See application file for complete search history.

(56) References Cited

U.S. PATENT DOCUMENTS

| | | | |
|---|---|---|---|
| 2014/0375490 A1 | 12/2014 | Pfitzenmaier et al. | |
| 2019/0165461 A1* | 5/2019 | Shiozaki | ............... H01Q 21/08 |

FOREIGN PATENT DOCUMENTS

| | | | |
|---|---|---|---|
| DE | 102009042285 A1 | | 3/2011 |
| JP | 8-102608 A | | 4/1996 |
| JP | 2004-258044 A | | 9/2004 |
| JP | 2017-58196 A | | 3/2017 |
| JP | 2017058196 A | * | 3/2017 |

* cited by examiner

*Primary Examiner* — Bernarr E Gregory
*Assistant Examiner* — Juliana Cross
(74) *Attorney, Agent, or Firm* — Maschoff Brennan

(57) ABSTRACT

A radar device configured to emit radio waves and detects an object present in a prescribed detection region includes an antenna unit and a radio wave reflector. The antenna unit is configured to emit the radio waves. The radio wave reflector is disposed in a region around the antenna unit and outside the detection region and includes a reflection surface having a height gradually changed with respect to an installation surface of the radar device.

9 Claims, 21 Drawing Sheets

FIG.2C
FIG.2A
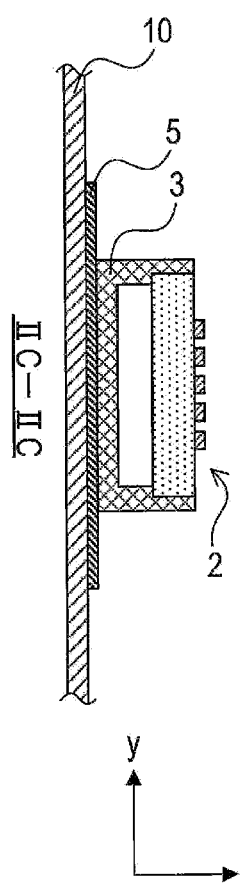
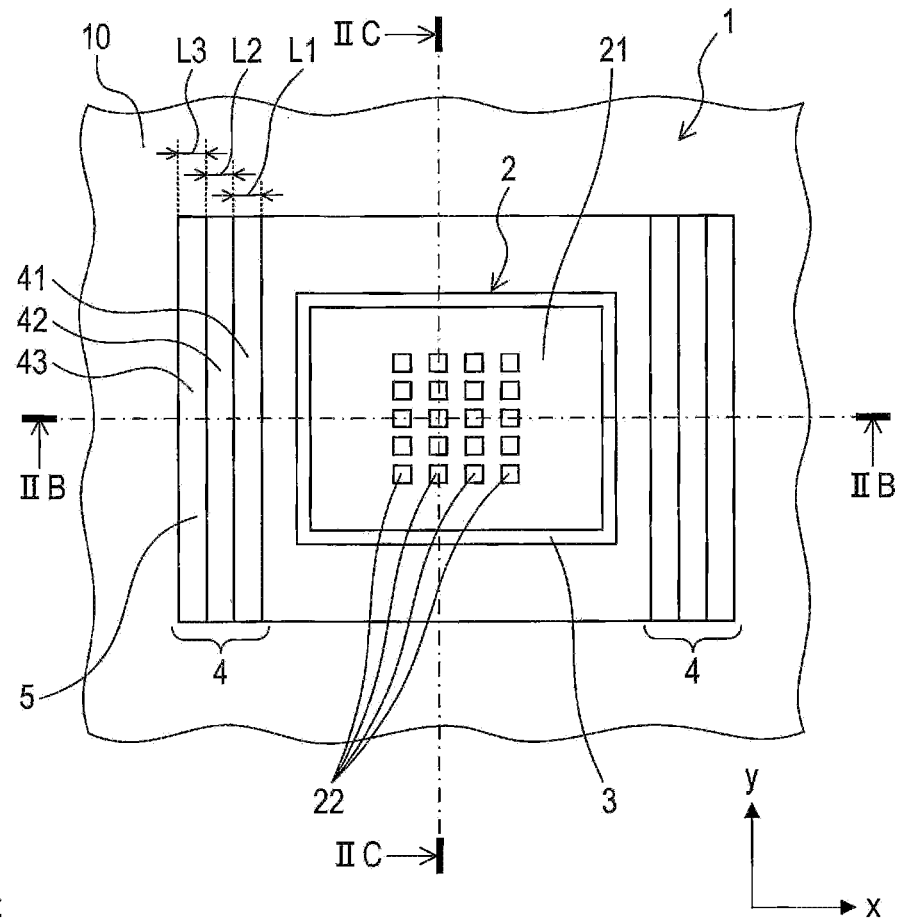
FIG.2B
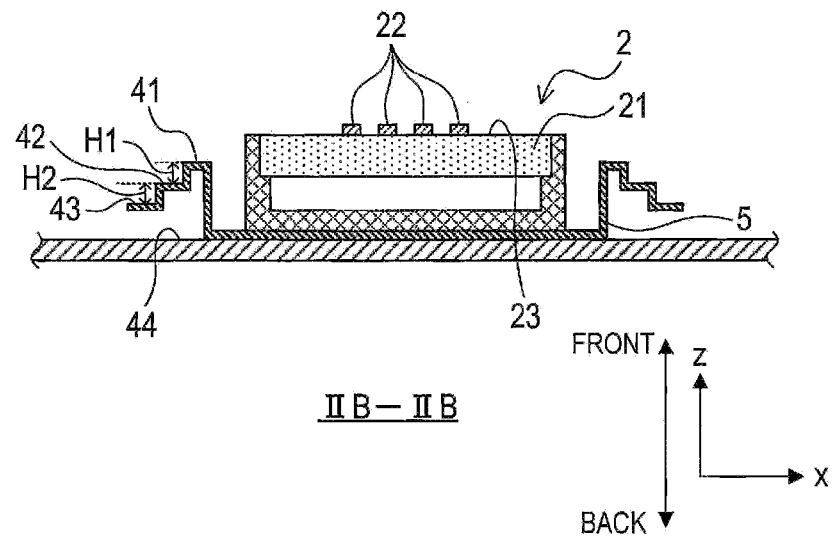

FIG.9C
FIG.9A
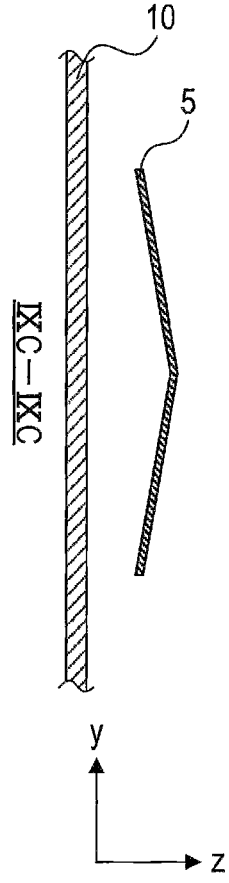
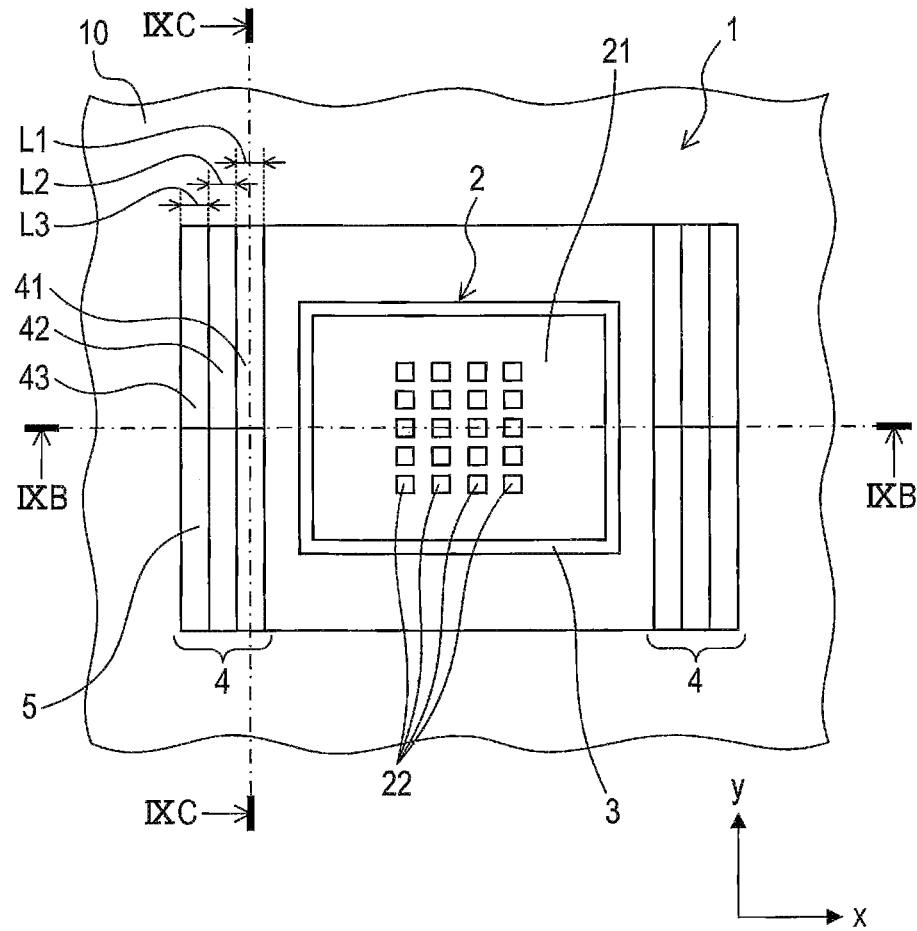
FIG.9B
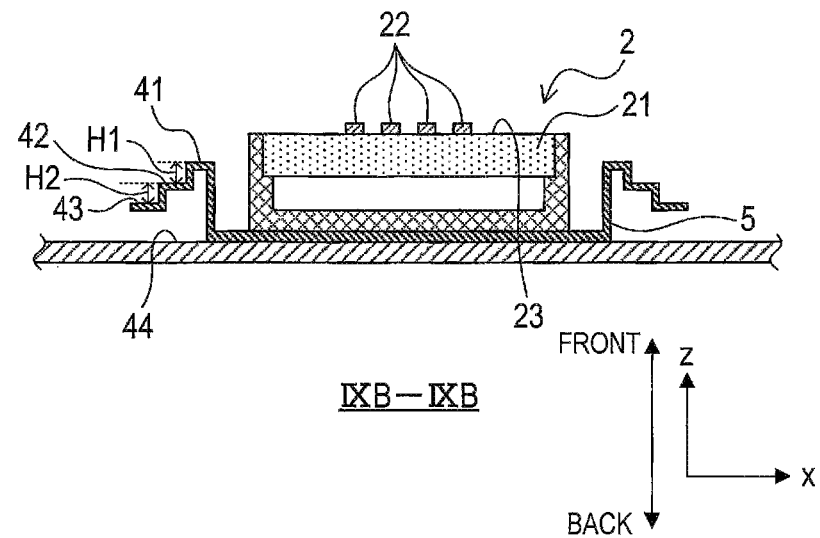
IXB—IXB

FIG.14C
FIG.14A
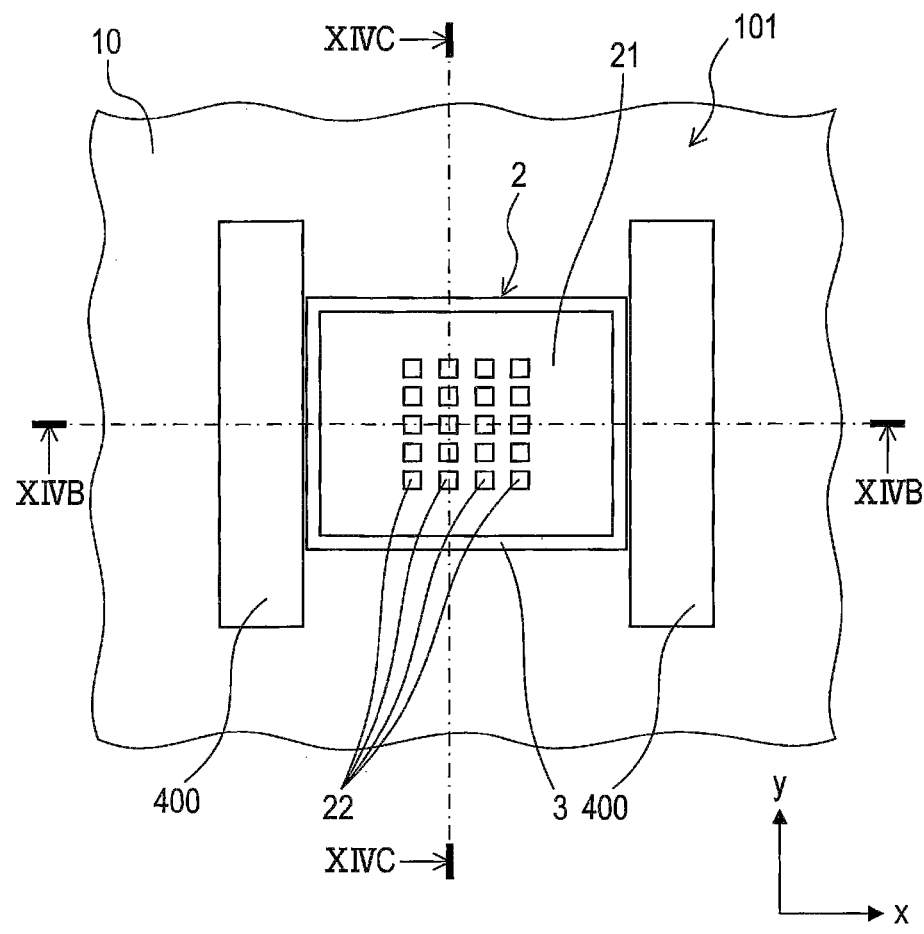
FIG.14B
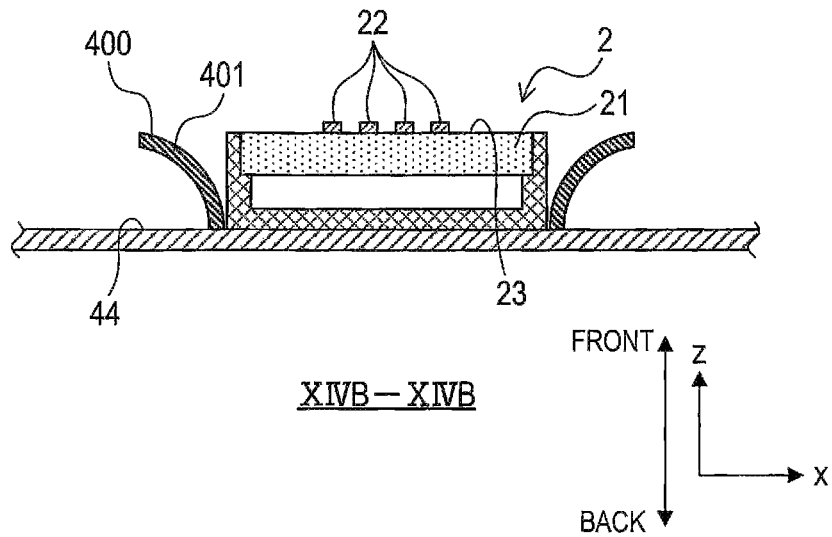
XIVB—XIVB

XVB—XVB

FIG.16C
FIG.16A
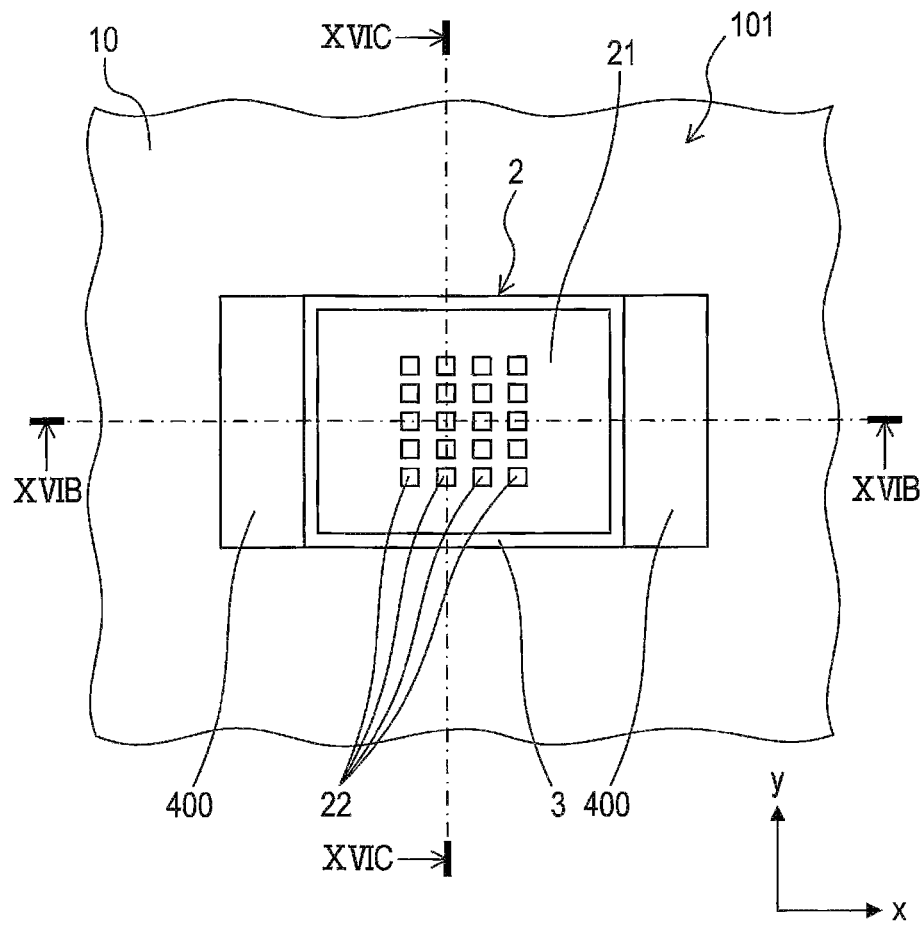
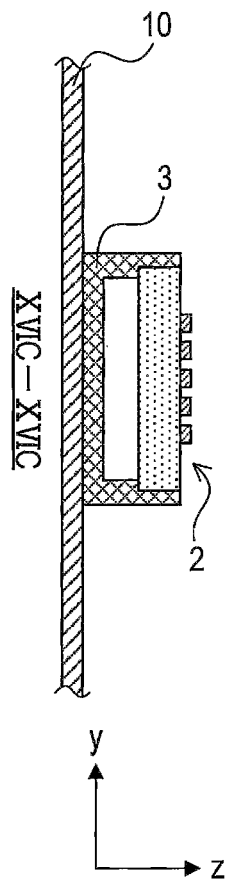
FIG.16B
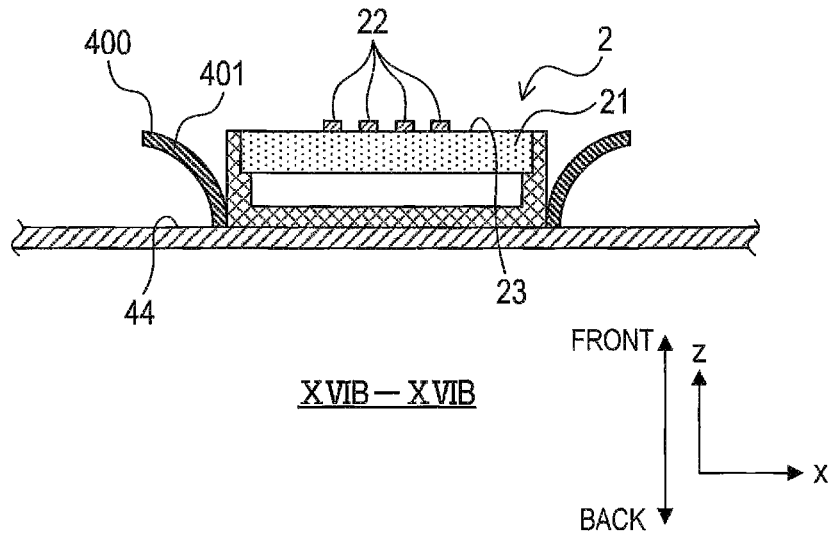

FIG.17C
FIG.17A
FIG.17B
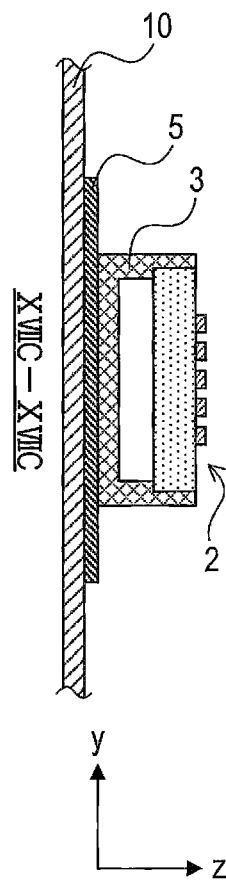
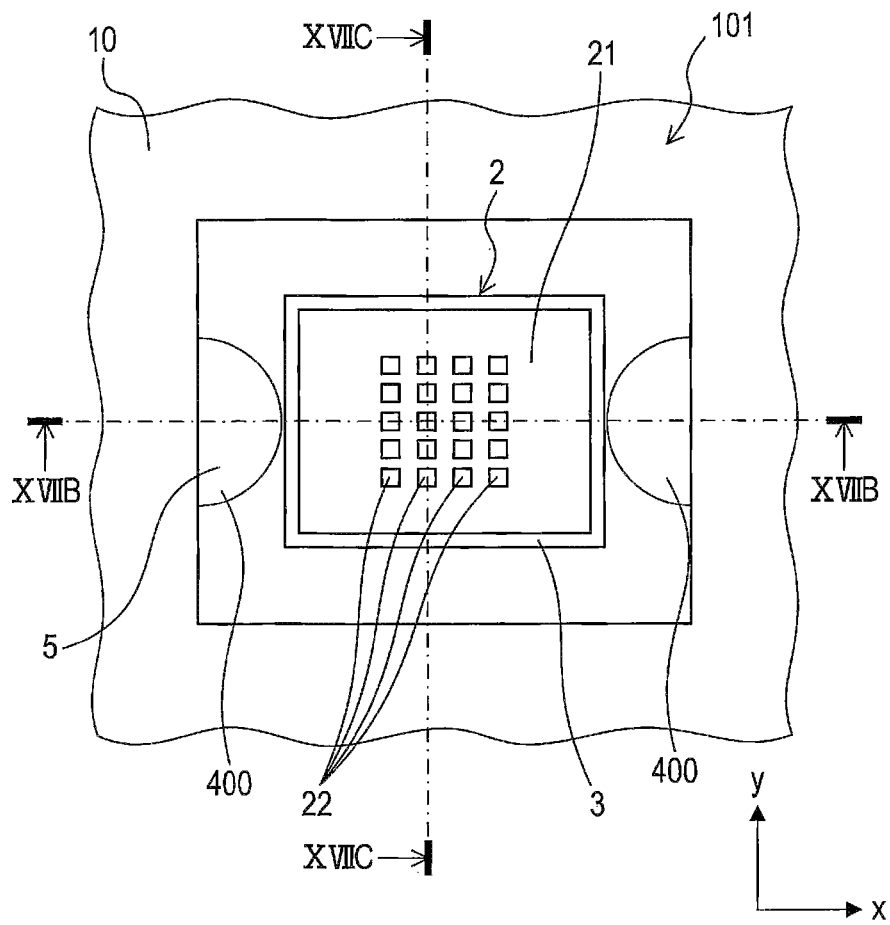
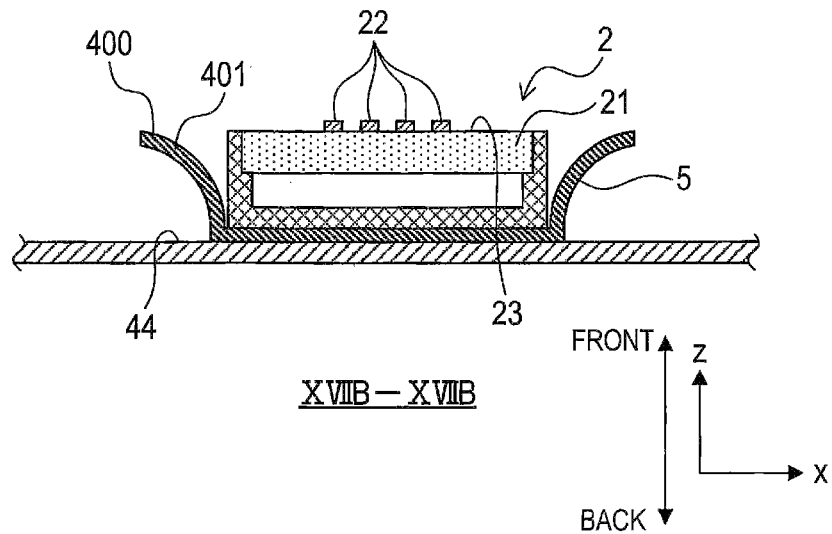

FIG.19C
FIG.19A
FIG.19B
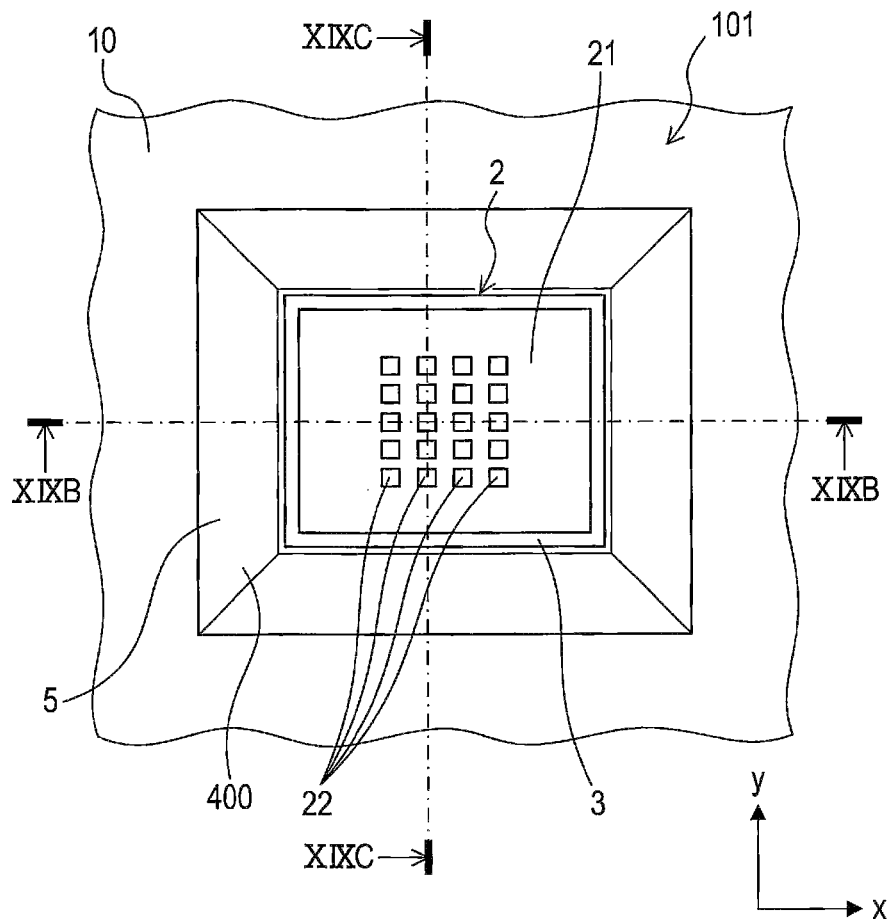
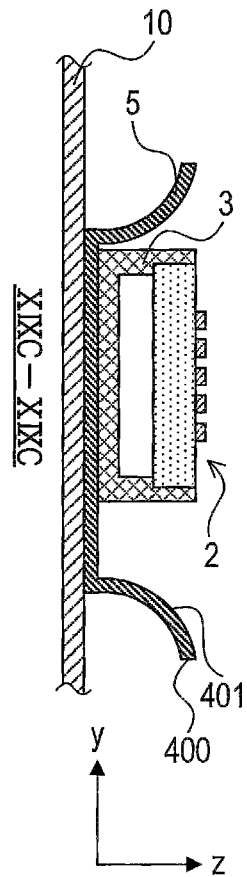
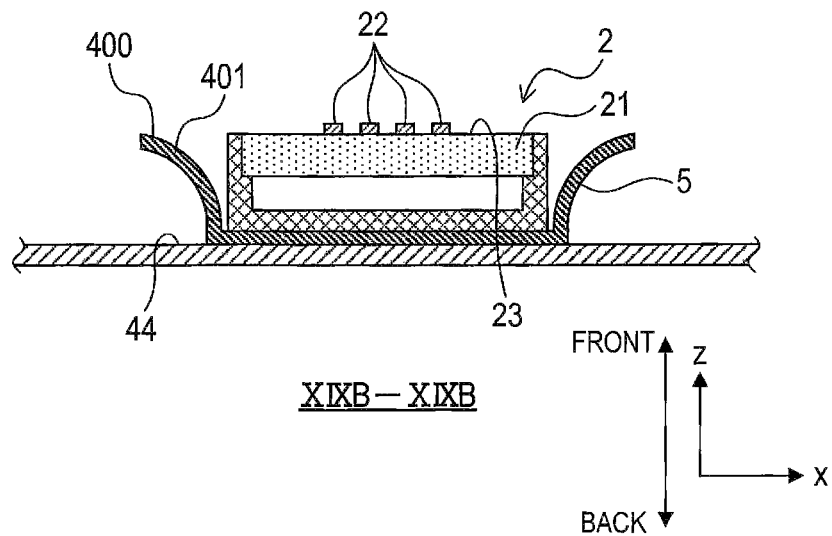

RADAR DEVICE AND BRACKET FOR RADAR DEVICE

CROSS-REFERENCE TO RELATED APPLICATION

This application is the U.S. bypass application of International Application No. PCT/JP2020/015868 filed on Apr. 8, 2020 which designated the U.S. and claims priority to Japanese Patent Application No. 2019-073423 filed on Apr. 8, 2019, the contents of both of which are incorporated herein by reference.

TECHNICAL FIELD

The present disclosure relates to a radar device and a bracket for a radar device used in the radar device.

BACKGROUND

A millimeter wave radar used for the purpose of, for example, autonomous driving and collision prevention of a vehicle is known. The millimeter wave radar is a radar for detecting the presence of an object in a prescribed detection area or the distance to the object by emitting radio waves and detecting reflected waves generated by the emitted radio waves being reflected on the object. The radio waves of this type of millimeter wave radar include, as unnecessary waves, waves that travels out of a desired emittance region or travels wrapping around an unintended region. These unnecessary waves lead to an object detection error.

SUMMARY

A first aspect of the present disclosure is a radar device configured to emit radio waves and detects an object present in a prescribed detection region, the radar device including an antenna unit and a radio wave reflector. The antenna unit emits the radio waves. The radio wave reflector is disposed in a region around the antenna unit and out of the detection region and includes a reflection surface having a height gradually changed with respect to an installation surface of the radar device.

A second aspect of the present disclosure is a bracket for attaching the radar device to a vehicle, the bracket including the radio wave reflector. The radio wave reflector is, in attachment to the radar device, disposed in the region around the antenna unit that emits the radio waves and outside the detection region, the radio wave reflector including the reflection surface that has a height gradually changed with respect to the installation surface of the radar device.

BRIEF DESCRIPTION OF THE DRAWINGS

The above features of the present disclosure will be made clearer by the following detailed description, given referring to the appended drawings. In the accompanying drawings:

FIG. 2A shows a schematic view of a radar device according to a first modified example of the first embodiment;
FIG. 2B shows a schematic sectional view taken along line IIB-IIB in FIG. 2A;
FIG. 2C shows a schematic sectional view taken along line IIC-IIC in FIG. 2A;
FIG. 9A shows a schematic view of a radar device according to an eighth modified example of the first embodiment;
FIG. 9B shows a schematic sectional view taken along line IXB-IXB in FIG. 9A;
FIG. 9C shows a schematic sectional view taken along line IXC-IXC in FIG. 9A.

FIG. 14A shows a schematic view of a radar device according to a second embodiment;

FIG. 14B shows a schematic sectional view taken along line XIVB-XIVB in FIG. 14A;

FIG. 14C shows a schematic sectional view taken along line XIVC-XIVC in FIG. 14A;

FIG. 16A shows a schematic view of a radar device according to a second modified example of the second embodiment;

FIG. 16B shows a schematic sectional view taken along line XVIB-XVIB in FIG. 16A;

FIG. 16C shows a schematic sectional view taken along line XVIC-XVIC in FIG. 16A;

FIG. 17A shows a schematic view of a radar device according to a third modified example of the second embodiment;

FIG. 17B shows a schematic sectional view taken along line XVIIB-XVIIB in FIG. 17A;

FIG. 17C shows a schematic sectional view taken along line XVIIC-XVIIC in FIG. 17A;

FIG. 19A shows a schematic view of a radar device according to a fifth modified example of the second embodiment;

FIG. 19B shows a schematic sectional view taken along line XIXB-XIXB in FIG. 19A;

FIG. 19C shows a schematic sectional view taken along line XIXC-XIXC in FIG. 19A;

DETAILED DESCRIPTION OF THE PREFERRED EMBODIMENTS

Figure 1C:
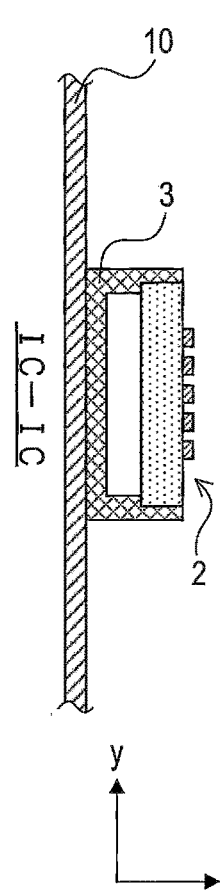
FIG. 1C shows a schematic sectional view taken along line IC-IC in FIG. 1A.

JP 2014-547812 A discloses a technique of reducing azimuth detection errors. The azimuth detection errors are errors in azimuth of an object with respect to a radar device. JP 2014-547812 A discloses a technique of disposing an absorbing element formed of a material that absorbs electromagnetic waves to suppress multiple reflection of unnecessary waves and the like and thus reducing the errors.

As a result of detailed studies of the inventors of the present invention, however, the technique described in JP 2014-547812 A requires installation of the absorbing element separately from the radar device and thus has been found to have a problem of increasing the production costs.

In one aspect of the present disclosure, a radar device is preferably provided that has a new structure enabling reducing azimuth detection errors of a radar and reducing the production costs.

A first aspect of the present disclosure is a radar device configured to emit radio waves and detects an object present in a prescribed detection region, the radar device including an antenna unit and a radio wave reflector. The antenna unit emits the radio waves. The radio wave reflector is disposed in a region around the antenna unit and out of the detection region and includes a reflection surface having a height gradually changed with respect to an installation surface of the radar device.

This configuration allows the radio wave reflector disposed in the periphery of the radar to reflect unnecessary waves on the reflection surface having a height gradually changed with respect to the installation surface, and thus disperse the phases of the reflected waves from the reflection surface and reduce disturbance of phase caused by the reflected unnecessary waves interfering with the waves emitted from the radar. Therefore, the azimuth detection errors of the radar can be reduced. Further, this configuration enables reducing object detection errors of the radar without the provision of the radio wave absorbing element or the like, thus enabling reducing the production costs by not needing to provide the radio wave absorbing element or the like.

A second aspect of the present disclosure is a bracket for attaching the radar device to a vehicle, the bracket including the radio wave reflector. The radio wave reflector is, in attachment to the radar device, disposed in the region around the antenna unit that emits the radio waves and outside the detection region, the radio wave reflector including the reflection surface that has a height gradually changed with respect to the installation surface of the radar device.

This configuration allows the bracket to itself exhibit the same effects as the effects described above.

Hereinafter, exemplary embodiments of the present disclosure are described with reference to drawings.

1. First Embodiment

[1-1. Configuration]

A radar device 1 according to the present first embodiment is mounted on a vehicle 10 and detects an object by emitting, as radiation waves, radio waves having a predetermined frequency, and detecting reflected waves generated by the radiation waves being reflected on the object. This radar device 1 is installed in, for example, a bumper of the vehicle 10 and detects an object around the vehicle 10.

Figure 1A:
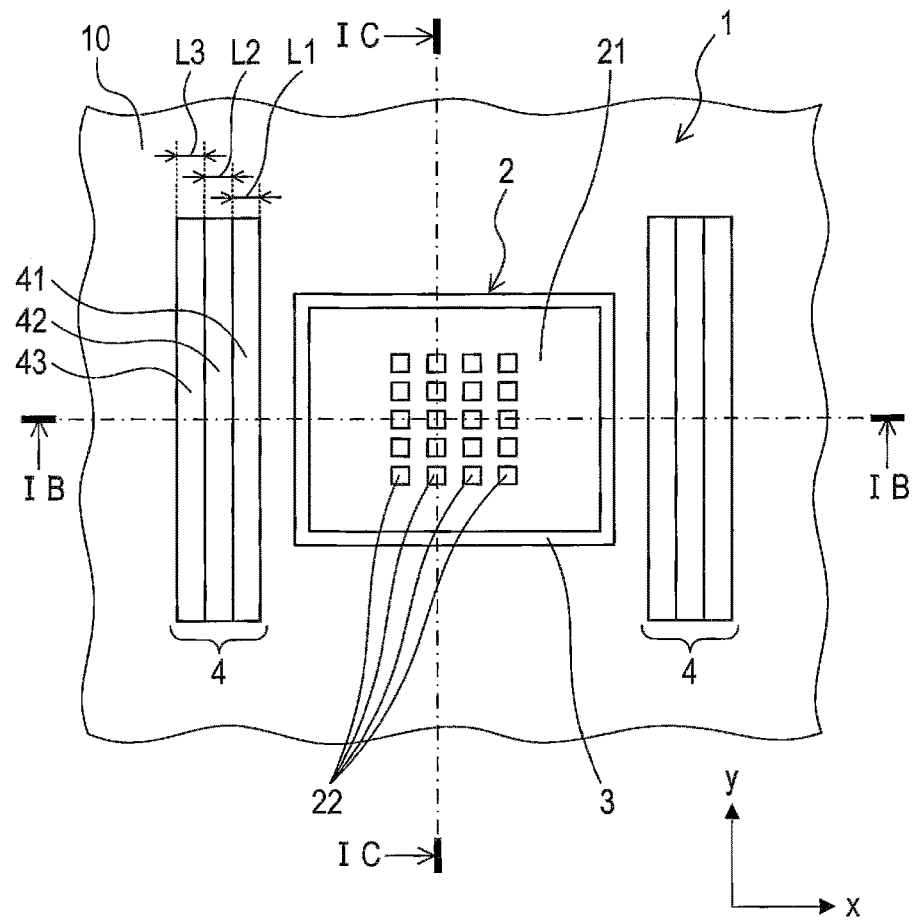
FIG. 1A shows a schematic view of a radar device according to a first embodiment.
Figure 1B:
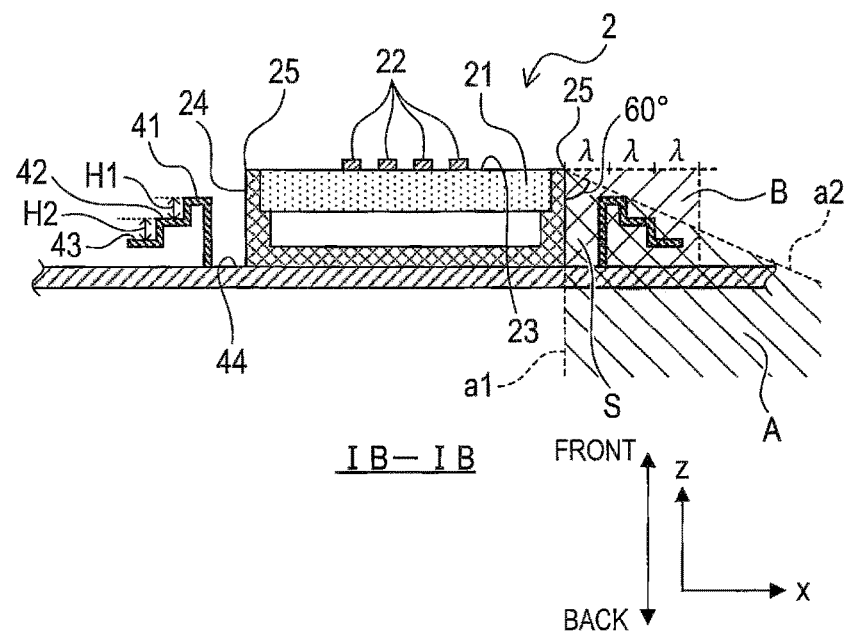
FIG. 1B shows a schematic sectional view taken along line IB-IB in FIG. 1A.

The radar device 1 illustrated in FIG. 1 includes an antenna unit 2 and a radio wave reflector 4. The antenna unit 2 includes a housing 3. The radar device 1 may also include a cover for protecting the antenna unit 2.

The radar device 1 also includes, for example, a transmission and reception circuit that transmits and receives radiation waves and reflected waves via the antenna unit 2, and a signal processing unit that processes a signal received by the transmission and reception circuit to acquire information of an object around the vehicle 10.

The antenna unit 2 includes an antenna substrate 21 that has a rectangular shape. A plurality of antenna elements 22 that transmit and receive radio waves are disposed on one of both surfaces of the antenna substrate 21. Hereinafter, the surface of the antenna substrate 21 on which the antenna elements 22 are formed is referred to as an antenna surface 23. The antenna substrate 21 is housed in the housing 3 and fixed to the housing 3. The housing 3 is formed of a metal material and acts as a ground.

The antenna unit 2 does not necessarily have to include the housing 3 and may be directly installed in the vehicle 10.

Here, the long-side direction and the short-side direction of the antenna substrate 21 are respectively defined as an x-axis direction and a y-axis direction, and an axial direction vertical to the antenna surface 23 of the antenna substrate 21 is defined as a z-axis direction. Hereinafter, the radar device 1 is described using these three-dimensional coordinate axes xyz as appropriate. In addition, hereinafter, the plus direction in the z axis is defined as the front, and the minus direction in the z axis is defined as the back. Further, with the antenna surface 23 regarded as a boundary, a side of the antenna surface 23 from which radiation waves are emitted is defined as the antenna front, and the opposite side of the antenna surface 23 is defined as the antenna back. The x-axis direction is an azimuth (here, an azimuth in the horizontal direction) direction in which an object is present and is also hereinafter referred to as an azimuth detection direction.

On the antenna substrate 21, the plurality of antenna elements 22 are arranged in line with the x-axis direction and the y-axis direction in FIG. 1. Among the plurality of antenna elements 22, one row of antenna elements 22 in line with the y-axis direction constitute an array antenna. That is, the antenna unit 2 has a structure including a plurality of array antennas arranged along the x-axis direction.

When mounted on the vehicle 10, the radar device 1 is placed so that the y-axis direction coincides with the vehicle height direction, the x-axis direction coincides with the horizontal direction, and the z-axis direction coincides with the center direction of a detection area. The detection area refers to an area in the region that forms a prescribed solid angle with the center of the antenna surface 23. Hereinafter, among the radiation waves, radiation waves emitted to the outside of the detection area are also referred to as unnecessary waves.

Any one array antenna is used as a transmission antenna, and the other array antennas are used as reception antennas. The form of the transmission antenna and the reception antenna, however, is not limited to this example, and the disposition of an array antenna used as the transmission antenna and an array antenna used as the reception antenna can be set in any way. In addition, all the array antennas may be used as the transmission antenna and the reception antenna.

The radio wave reflector 4 is formed of a metal material. The radio wave reflector 4 is designed to have a shape allowing reflection thereat of unnecessary waves emitted from the antenna unit 2 and leaked to the outside of the detection area.

The radio wave reflector 4 is disposed on each of opposite sides of the antenna unit 2 along the azimuth detection direction, that is, the x-axis direction in the drawing. The two radio wave reflectors 4 are directly installed on an installation surface 44 of the vehicle 10. The two radio wave reflectors 4 have shapes that are symmetric in the azimuth detection direction. Hereinafter, the configuration and the shape of the radio wave reflectors 4 are specifically described, focusing on one of the radio wave reflectors 4.

The radio wave reflector 4 is formed to have a length along the y-axis direction that is longer than the width in the y-axis direction of the housing 3.

The radio wave reflector 4 includes a first metal surface 41, a second metal surface 42, and a third metal surface 43. These first metal surface 41, second metal surface 42, and third metal surface 43 function as reflection surfaces that reflect the unnecessary waves. The first metal surface 41, the second metal surface 42, and the third metal surface 43 have heights that are different from each other in the z-axis direction, and are formed to have a three-step stair shape. Specifically, the metal material extends from the installation surface 44 to the front, and extends while horizontally bending at 90° so as to be away from the antenna unit 2 and thus forms the first metal surface 41. Further, the metal material extends from the first metal surface 41 while bending at 90° to the back, and further extends while horizontally bending at 90° so as to be away from the antenna unit 2 and thus forms the second metal surface 42. Furthermore, the metal material extends from the second metal surface 42 while bending at 90° to the back, and further extends while horizontally bending at 90° so as to be away from the antenna unit 2 and thus forms the third metal surface 43. The first metal surface 41, the second metal surface 42, and the third metal surface 43, however, are not formed in an order such as forming the first metal surface 41 first, but can be integrally formed.

As described above, the radio wave reflector 4 is, in the present first embodiment, formed so as to have a height (that is, the height from the installation surface 44) gradually decreased from the center of the antenna unit 2 toward the outer edge of the third metal surface 43 that is the outermost metal surface among the first metal surface 41, the second metal surface 42, and the third metal surface 43. In addition, the first metal surface 41, the second metal surface 42, and the third metal surface 43 are formed so as to be substantially parallel with the antenna surface 23.

Here, a region A is defined as a region between a line a1 that passes an upper end portion 25 of a side wall 24 in the azimuth detection direction of the antenna unit 2 and is substantially vertical to the installation surface 44, and a line a2 that passes the upper end portion 25 and is along a direction toward the installation surface 44, the region A having an angle of about 60° or less formed between the two lines (a1, a2). A region B is defined as a region having a length within three wavelengths λ of the radio waves from the upper end portion 25 along the azimuth detection direction. The whole of the radio wave reflector 4 is disposed in a region S in which the region A overlaps the region B. The region S has the same form in the other embodiment described below, and is therefore neither described nor illustrated in the other embodiment.

In addition, the width, that is, the length from one end to the other end along the x-axis direction in the drawing, of each of the metal surfaces in the radio wave reflector 4 is shorter than one wavelength of the radio waves. In the present first embodiment, a length L1 of the first metal surface 41, a length L2 of the second metal surface 42, and a length L3 of the third metal surface 43 are equal to each other. Meanwhile, the length L1 of the first metal surface 41, the length L2 of the second metal surface 42, and the length L3 of the third metal surface 43 may be different from each other.

The metal surfaces of the radio wave reflector 4 are formed so that differences H1 and H2 of height with respect to the installation surface 44 in the z-axis direction of the drawing between the metal surfaces each have a value other than a value obtained by multiplying one-half of wavelength of the radio waves by m set to a positive integer. Here, H1 is the difference between the height from the installation surface 44 to the first metal surface 41 and the height from the installation surface 44 to the second metal surface 42. H2 is the difference between the height from the installation surface 44 to the second metal surface 42 and the height from the installation surface 44 to the third metal surface 43. In the present first embodiment, H1 and H2 are equal to each other. Meanwhile, H1 and H2 may be different from each other as long as they satisfy the above conditions.

First Modified Example of First Embodiment

Next, a first modified example of the first embodiment is described with reference to FIG. 2. The present first modified example has the same basic configuration as that of the first embodiment, and identical symbols are assigned to common components. Hereinafter, differences are mainly described.

In the present first modified example, the radar device 1 includes a bracket 5 between the radar device 1 and the vehicle 10 in which the radar device 1 is installed. The bracket 5 is used for joining the radar device 1 to the vehicle 10. The bracket 5 is made from a metal.

The radar device 1 is attached to the vehicle 10 with the bracket 5 interposed therebetween. Specifically, the radar device 1 may be attached to the bracket 5 that has been attached to the vehicle 10, or may be fixed to the vehicle 10 with the bracket 5 interposed between the radar device 1 and the vehicle 10.

The radio wave reflector 4 is integrally formed with the bracket 5 and can be formed through bending by pressing or the like.

The configurations of the first metal surface 41, the second metal surface 42, and the third metal surface 43 are the same as those in the first embodiment.

Second Modified Example of First Embodiment

Figures 3A, 3B, 3C:
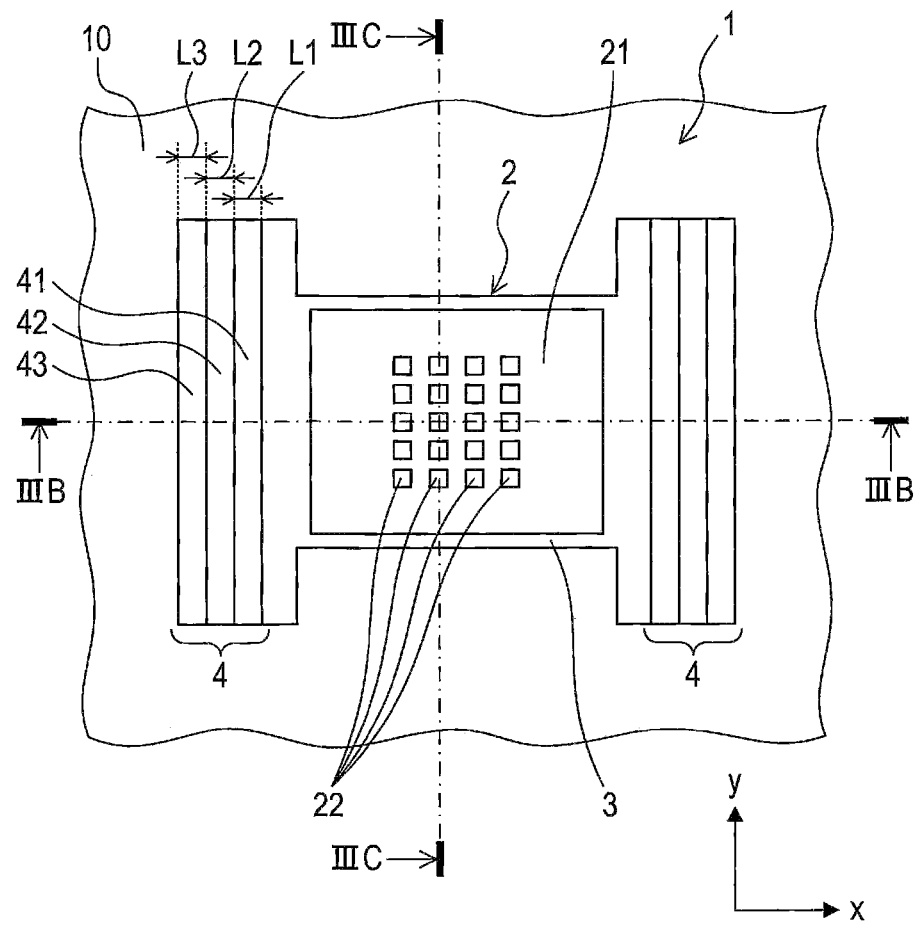
FIG. 3A shows a schematic view of a radar device according to a second modified example of the first embodiment.
FIG. 3B shows a schematic sectional view taken along line IIIB-IIIB in FIG. 3A.
FIG. 3C shows a schematic sectional view taken along line IIIC-IIIC in FIG. 3A.

Next, a second modified example of the first embodiment is described with reference to FIG. 3. The present second modified example has the same basic configuration as that of the first embodiment, and identical symbols are assigned to common components. Hereinafter, differences are mainly described.

The radio wave reflector 4 in the present second modified example is directly disposed on the housing 3 and is formed by bending the metal material upward from a contact point portion between each of both side surfaces in the x-axis direction of the housing 3 and the vehicle 10.

The housing 3 and the radio wave reflector 4 may be attached as separate components or may be integrally formed.

The configurations of the first metal surface 41, the second metal surface 42, and the third metal surface 43 are the same as those in the first embodiment.

Third Modified Example of First Embodiment

Figure 4C:
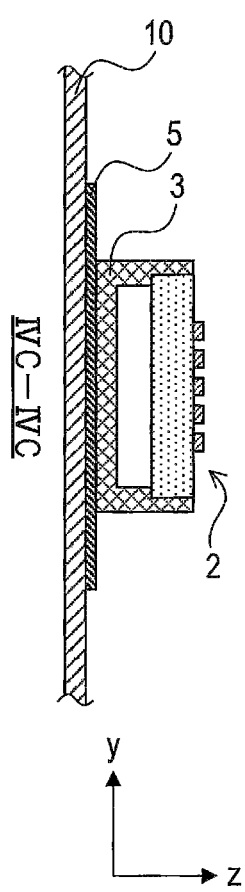
FIG. 4C shows a schematic sectional view taken along line IVC-IVC in FIG. 4A.
Figure 4A:
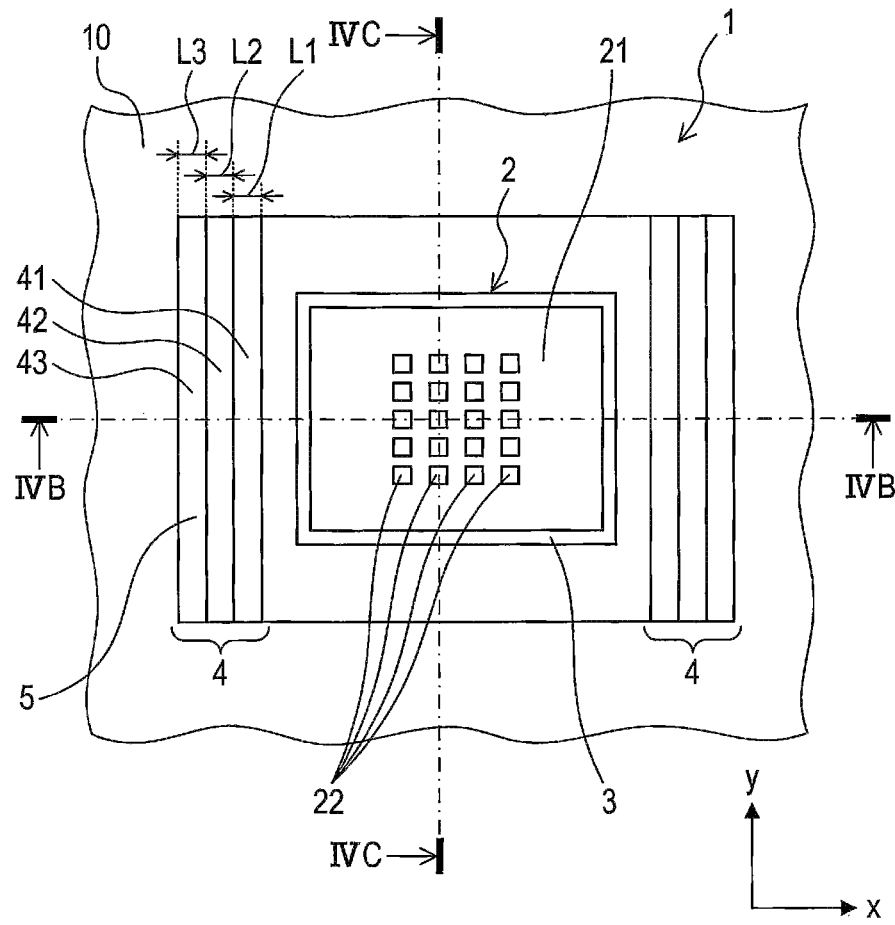
FIG. 4A shows a schematic view of a radar device according to a third modified example of the first embodiment.
Figure 4B:
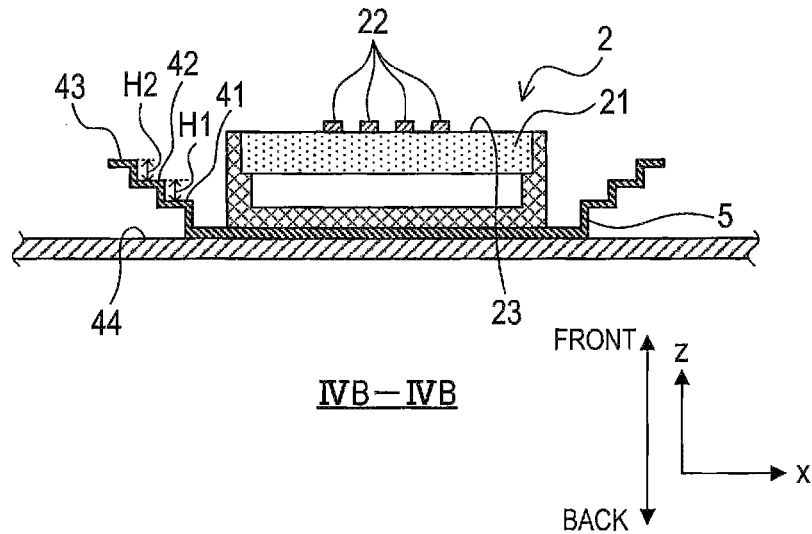
FIG. 4B shows a schematic sectional view taken along line IVB-IVB in FIG. 4A.

Next, a third modified example of the first embodiment is described with reference to FIG. 4. Third to tenth modified examples of the first embodiment described below have the same basic configuration as that of the first modified example of the first embodiment, and identical symbols are assigned to common components. Hereinafter, differences are mainly described.

The first metal surface 41, the second metal surface 42, and the third metal surface 43 of the radio wave reflector 4 in the present third modified example have heights that are different from each other in the z-axis direction, and are formed to have a three-step stair shape. Specifically, the metal material extends from the installation surface 44 to the front, and extends while horizontally bending at 90° so as to be away from the antenna unit 2 and thus forms the first metal surface 41. Further, the metal material extends from the first metal surface 41 while bending at 90° to the front, and further extends while horizontally bending at 90° so as to be away from the antenna unit 2 and thus forms the second metal surface 42. Furthermore, the metal material extends from the second metal surface 42 while bending at 90° to the front, and further extends while horizontally bending at 90° so as to be away from the antenna unit 2 and thus forms the third metal surface 43. As described above, the radio wave reflector 4 is, in the present modified embodiment 3, formed so as to have a height gradually increased from the center of the antenna unit 2 toward the outer edge of the third metal surface 43 that is the outermost metal surface among the first metal surface 41, the second metal surface 42, and the third metal surface 43.

Fourth Modified Example of First Embodiment

Figure 5C:
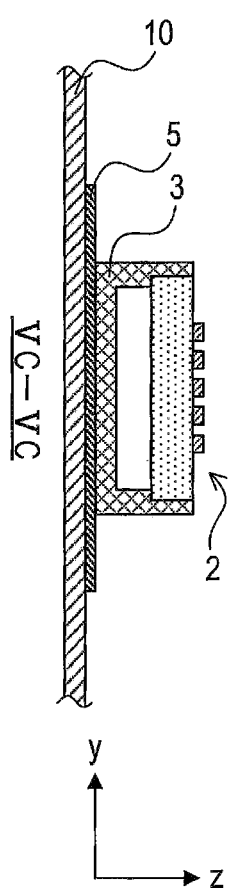
FIG. 5C shows a schematic sectional view taken along line VC-VC in FIG. 5A.
Figure 5A:
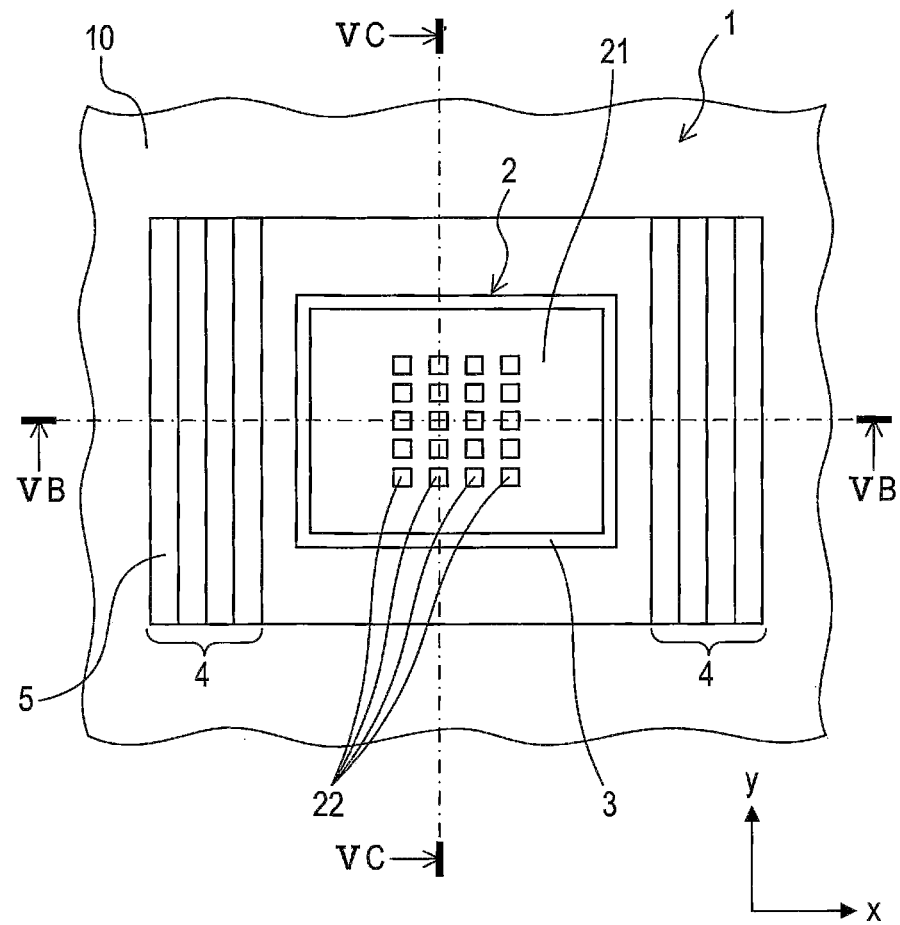
FIG. 5A shows a schematic view of a radar device according to a fourth modified example of the first embodiment.
Figure 5B:
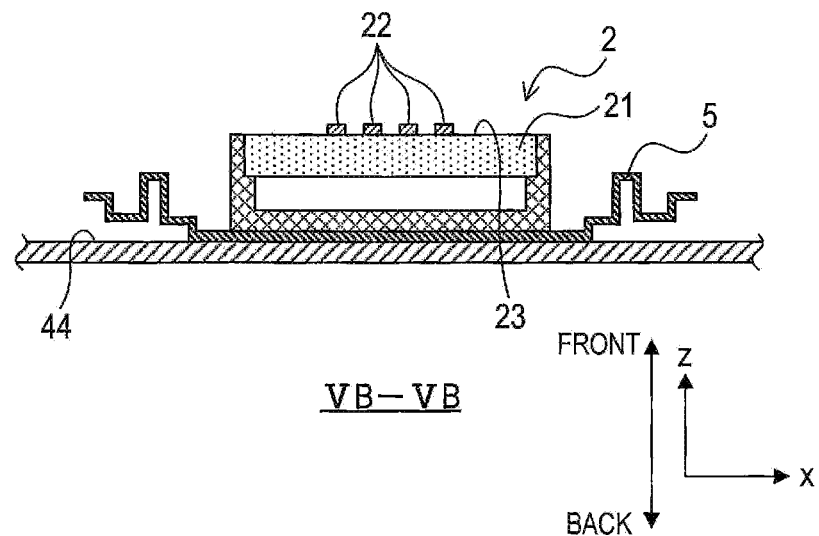
FIG. 5B shows a schematic sectional view taken along line VB-VB in FIG. 5A.

Next, a fourth modified example of the first embodiment is described with reference to FIG. 5.

The metal surfaces of the radio wave reflector 4 in the present fourth modified example have different heights in the z-axis direction and are formed so as to have an arrangement of steps having irregular heights.

Specifically, the radio wave reflector 4 includes a projection extending toward the front and includes a recess continuing from the projection and sinking to the back. The metal surfaces of the radio wave reflector 4 in the present fourth modified example are formed horizontally in the x-axis direction.

Also in the present modified example, the width, that is, the length from one end to the other end along the x-axis direction in the drawing, of each of the metal surfaces in the radio wave reflector 4 is configured to be shorter than one wavelength of the radio waves. In addition, the metal surfaces of the radio wave reflector 4 are formed so that the differences of height with respect to the installation surface 44 in the z-axis direction of the drawing between the metal surfaces each have a value other than a value obtained by multiplying one-half of wavelength of the radio waves by a positive integer m.

Fifth Modified Example of First Embodiment

Figure 6C:
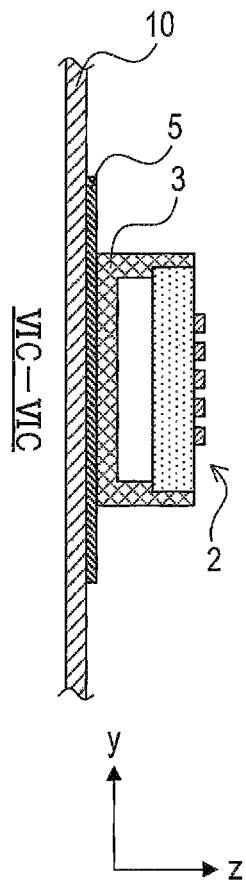
FIG. 6C shows a schematic sectional view taken along line VIC-VIC in FIG. 6A.
Figure 6A:
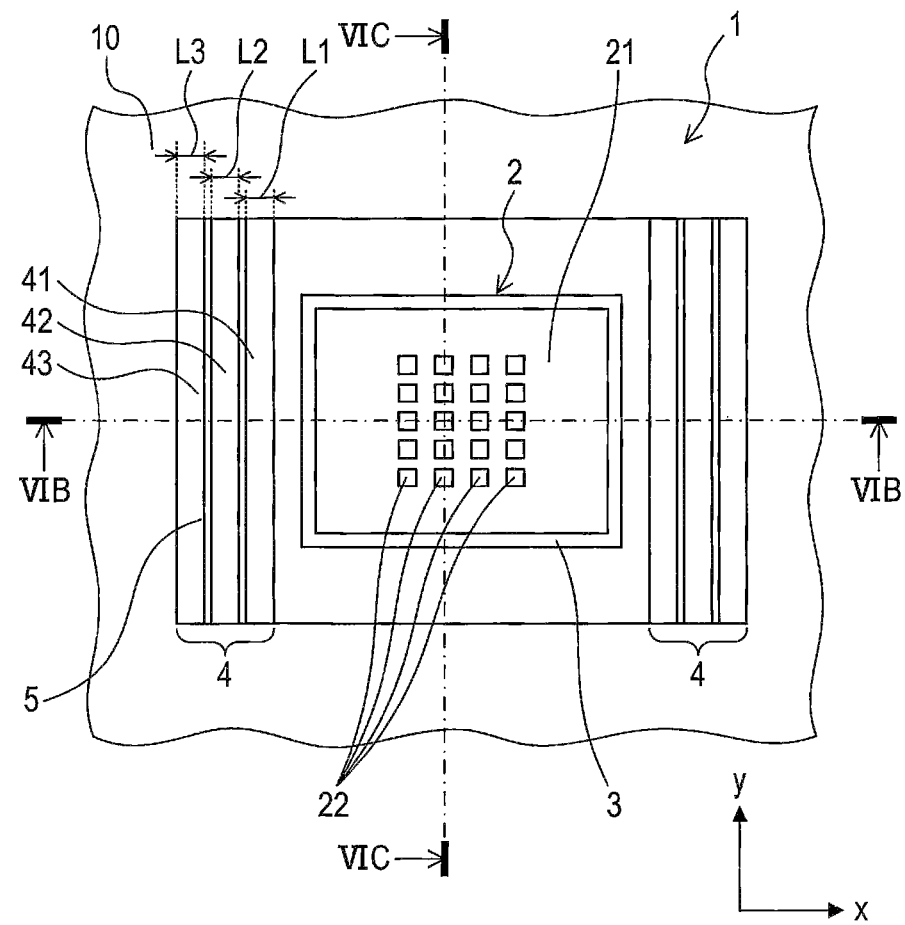
FIG. 6A shows a schematic view of a radar device according to a fifth modified example of the first embodiment.
Figure 6B:
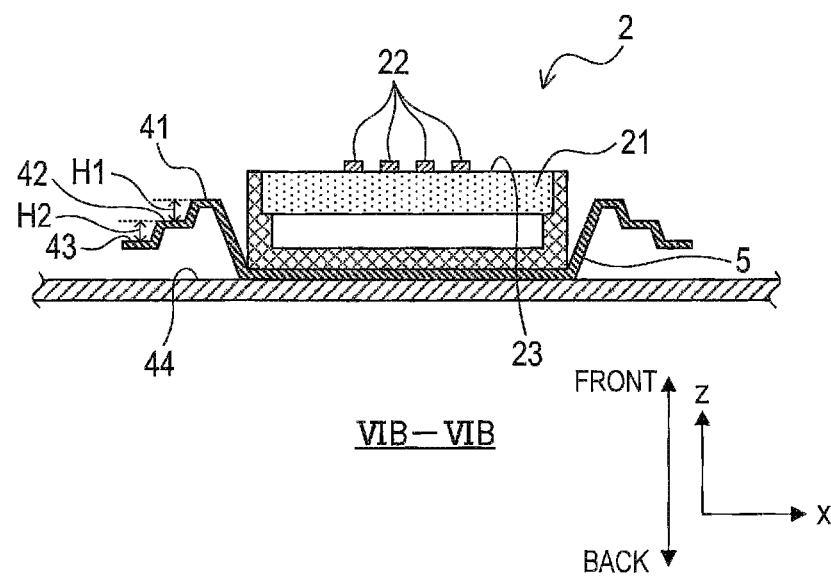
FIG. 6B shows a schematic sectional view taken along line VIB-VIB in FIG. 6A.

Next, a fifth modified example of the first embodiment is described with reference to FIG. 6.

The first metal surface 41, the second metal surface 42, and the third metal surface 43 in the present fifth modified example are connected to each other with diagonal surfaces. That is, the first metal surface 41, the second metal surface 42, and the third metal surface 43 are configured to be connected to each other with surfaces that are not parallel with the x-axis direction. Specifically, the metal material extending diagonally from the installation surface 44 to the front so as to be away from the antenna unit 2 extends while bending horizontally to the x-axis direction and thus forms the first metal surface 41. Further, the metal material extends from the first metal surface 41 while bending diagonally to the back so as to be away from the antenna unit 2, and further extends while bending horizontally to the x-axis direction and thus forms the second metal surface 42. Furthermore, the metal material extends from the second metal surface 42 while bending diagonally to the back so as to be away from the antenna unit 2 again, and further extends while bending horizontally to the x-axis direction and thus forms the third metal surface 43.

Sixth Modified Example of First Embodiment

Figure 7C:
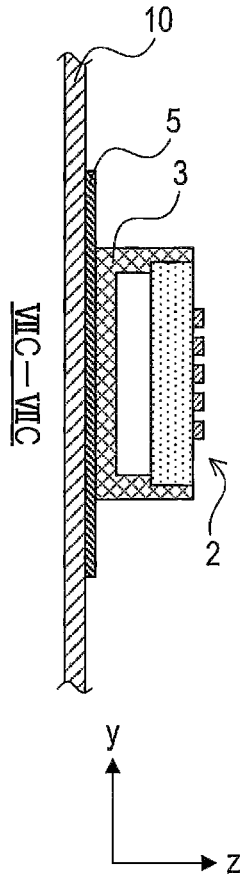
FIG. 7C shows a schematic sectional view taken along line VIIC-VIIC in FIG. 7A.
Figure 7A:
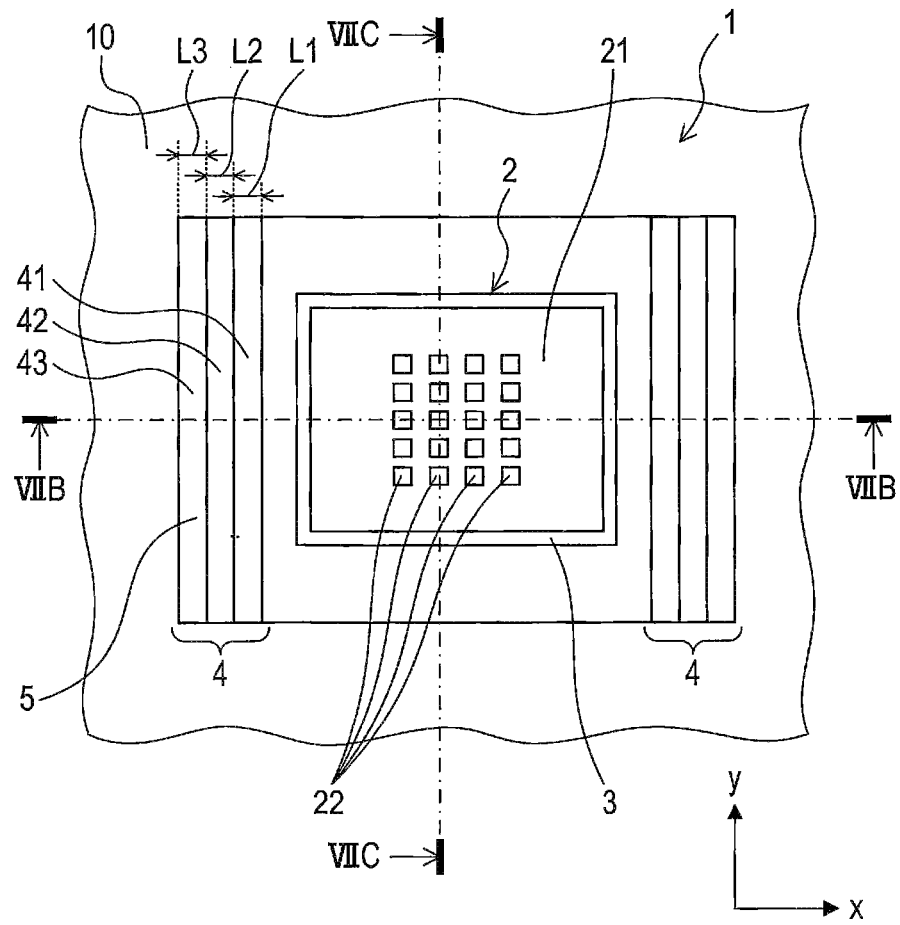
FIG. 7A shows a schematic view of a radar device according to a sixth modified example of the first embodiment.
Figure 7B:
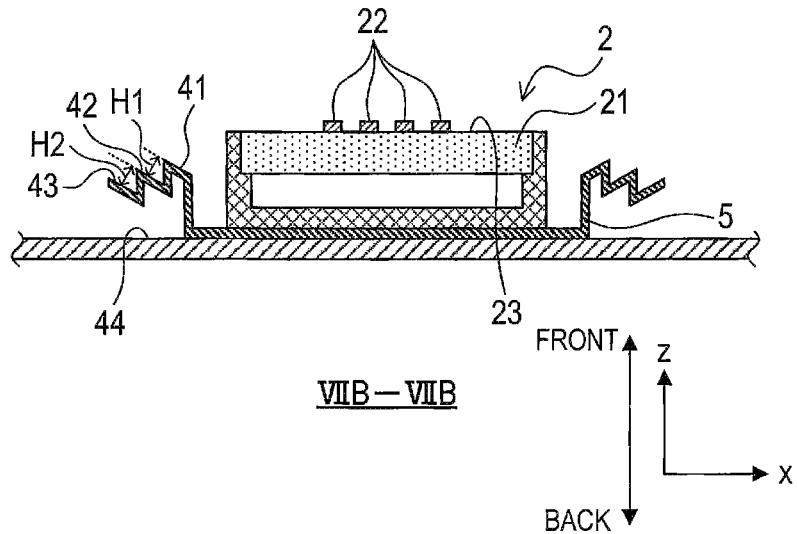
FIG. 7B shows a schematic sectional view taken along line VIIB-VIIB in FIG. 7A.

Next, a sixth modified example of the first embodiment is described with reference to FIG. 7.

The first metal surface 41, the second metal surface 42, and the third metal surface 43 in the present sixth modified example are configured to have an angle with respect to the x-axis direction and be thus not parallel with the x-axis direction. Specifically, the metal material extending from the installation surface 44 to the front extends while bending diagonally to the front so as to be away from the antenna unit 2 and thus forms the first metal surface 41. Further, the metal material extends from the first metal surface 41 while bending to the back, and further extends while bending diagonally to the front so as to be away from the antenna unit 2 and thus forms the second metal surface 42. Furthermore, the metal material extends from the second metal surface 42 while bending to the back again, and further extends while bending diagonally to the front so as to be away from the antenna unit 2 and thus forms the third metal surface 43.

Seventh Modified Example of First Embodiment

Figure 8C:
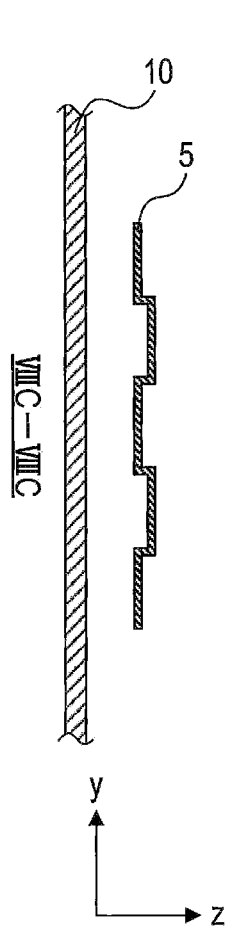
FIG. 8C shows a schematic sectional view taken along line VIIIC-VIIIC in FIG. 8A.
Figure 8A:
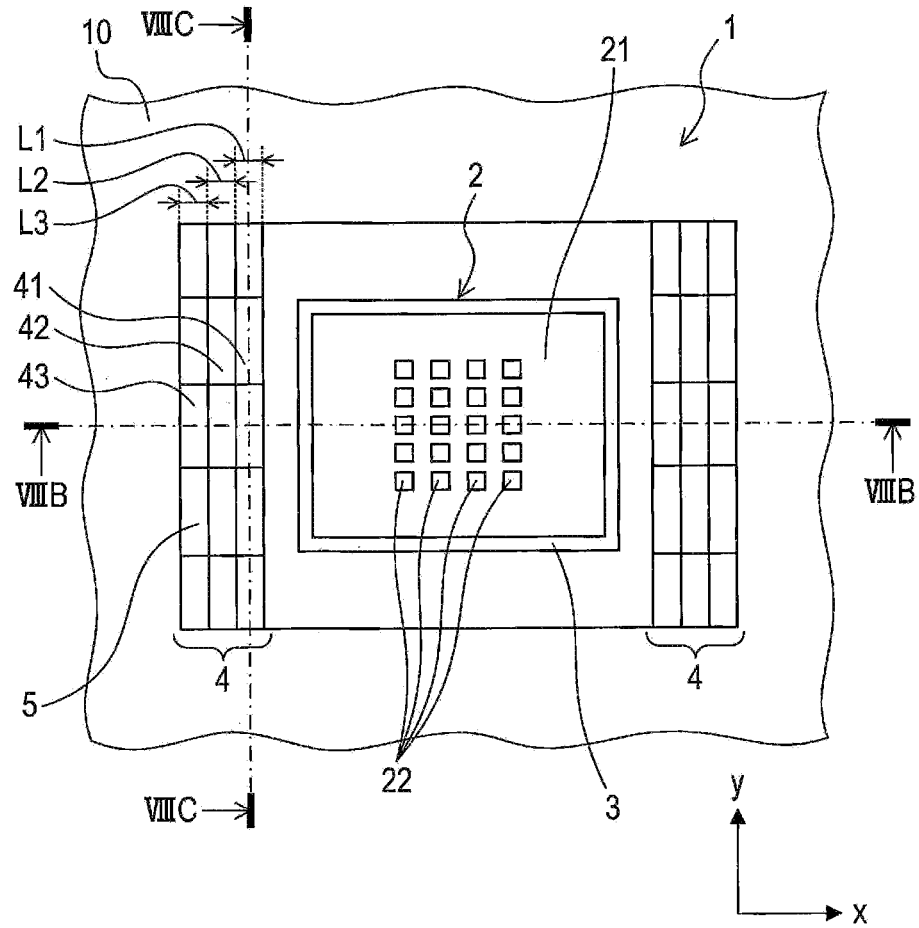
FIG. 8A shows a schematic view of a radar device according to a seventh modified example of the first embodiment.
Figure 8B:
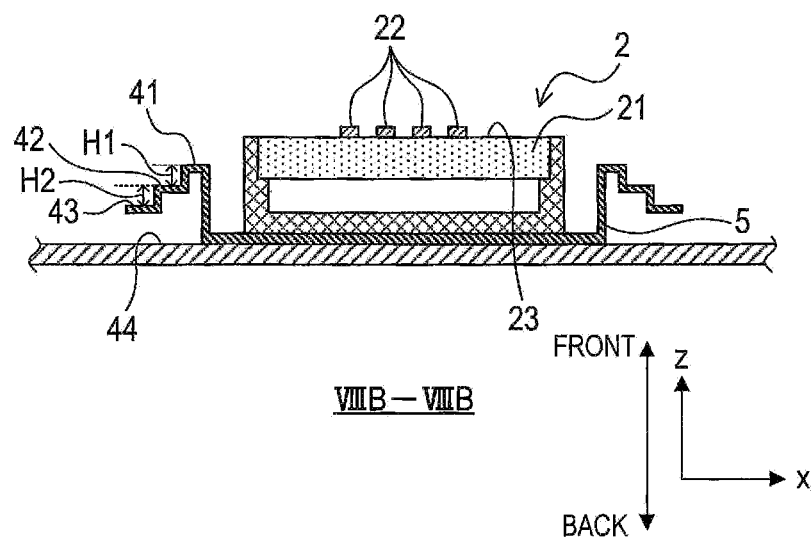
FIG. 8B shows a schematic sectional view taken along line VIIIB-VIIIB in FIG. 8A.

Next, a seventh modified example of the first embodiment is described with reference to FIG. 8.

The first metal surface 41, the second metal surface 42, and the third metal surface 43 in the present seventh modified example are configured to have a height changed with respect to the installation surface 44 along a direction substantially parallel with the installation surface 44 and substantially vertical in the azimuth detection direction. Specifically, the first metal surface 41, the second metal surface 42, and the third metal surface 43 of the radio wave reflector 4 are configured to have a step shape along the y-axis direction.

Eighth Modified Example of First Embodiment

Next, an eighth modified example of the first embodiment is described with reference to FIG. 9.

The first metal surface 41, the second metal surface 42, and the third metal surface 43 in the present eighth modified example are, similarly to the seventh modified example, configured to have a height changed with respect to the installation surface 44 along the direction substantially parallel with the installation surface 44 and substantially vertical to the azimuth detection direction. Specifically, the first metal surface 41, the second metal surface 42, and the third metal surface 43 of the radio wave reflector 4 are configured to have a mountain-fold (ridge-fold) shape along the y-axis direction.

Ninth Modified Example of First Embodiment

Figures 10A, 10C:
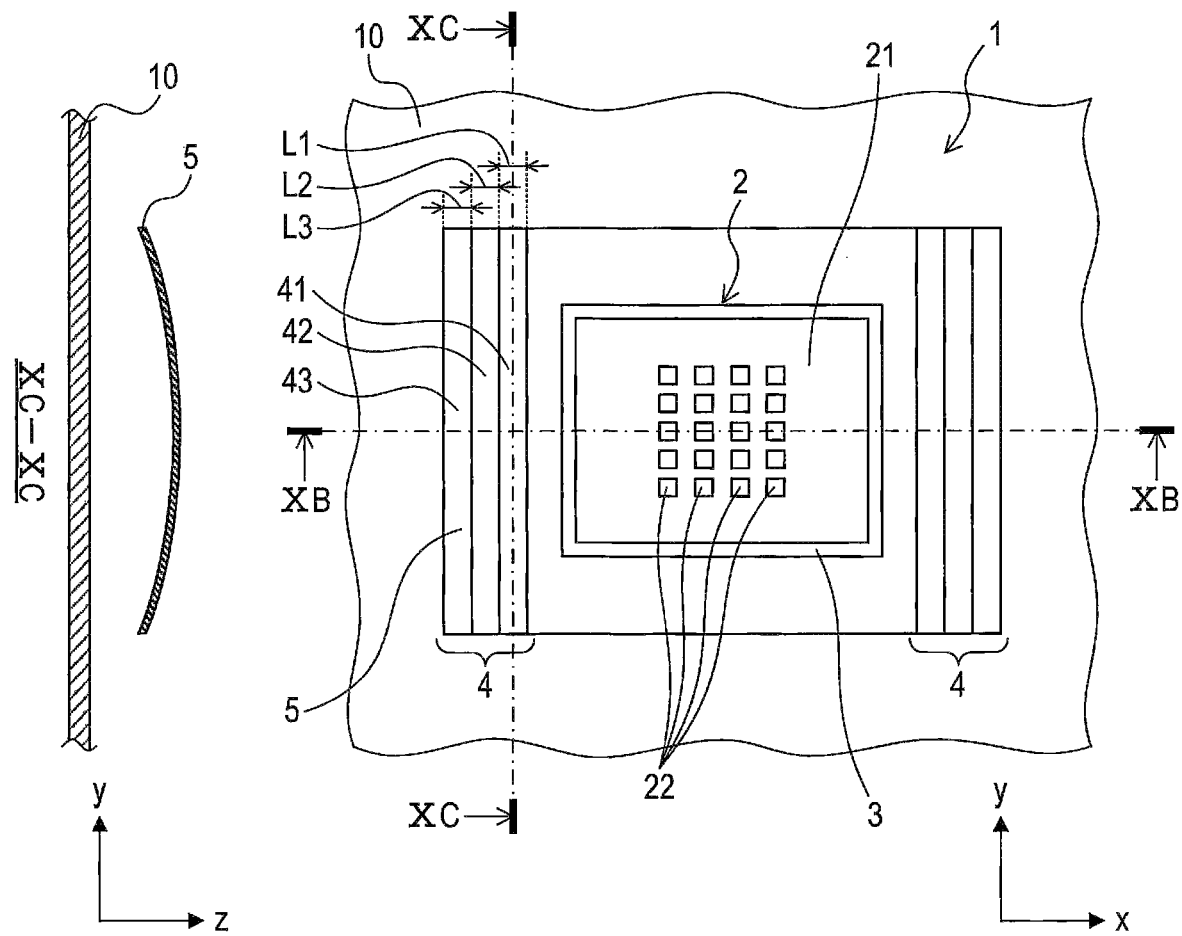
FIG. 10A shows a schematic view of a radar device according to a ninth modified example of the first embodiment.
FIG. 10C shows a schematic sectional view taken along line XC-XC in FIG. 10A.
Figure 10B:
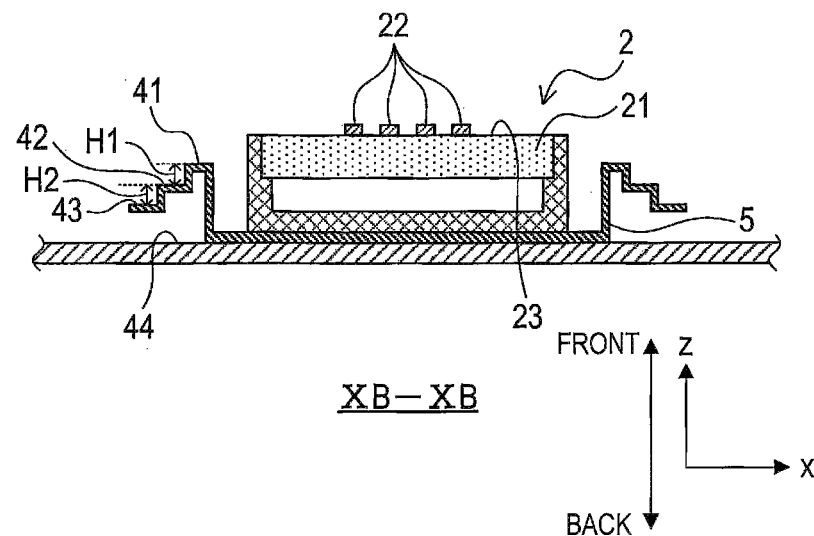
FIG. 10B shows a schematic sectional view taken along line XB-XB in FIG. 10A.

Next, a ninth modified example of the first embodiment is described with reference to FIG. 10.

The first metal surface 41, the second metal surface 42, and the third metal surface 43 in the present ninth modified example are, similarly to the modified examples 7 and 8, configured to have a height changed with respect to the installation surface 44 along the direction substantially parallel with the installation surface 44 and substantially vertical to the azimuth detection direction. Specifically, the first metal surface 41, the second metal surface 42, and the third metal surface 43 of the radio wave reflector 4 are configured to have a curved surface shape along the y-axis direction.

Tenth Modified Example of First Embodiment

Figure 11C:
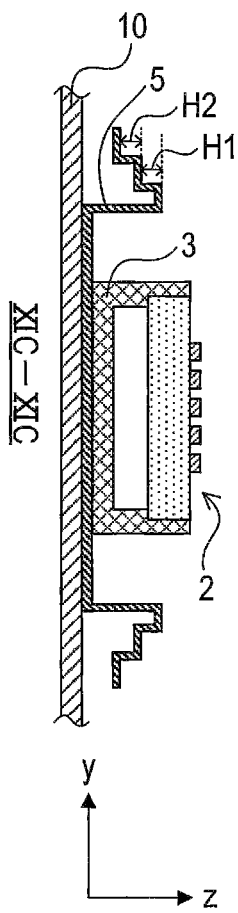
FIG. 11C shows a schematic sectional view taken along line XIC-XIC in FIG. 11A.
Figure 11A:
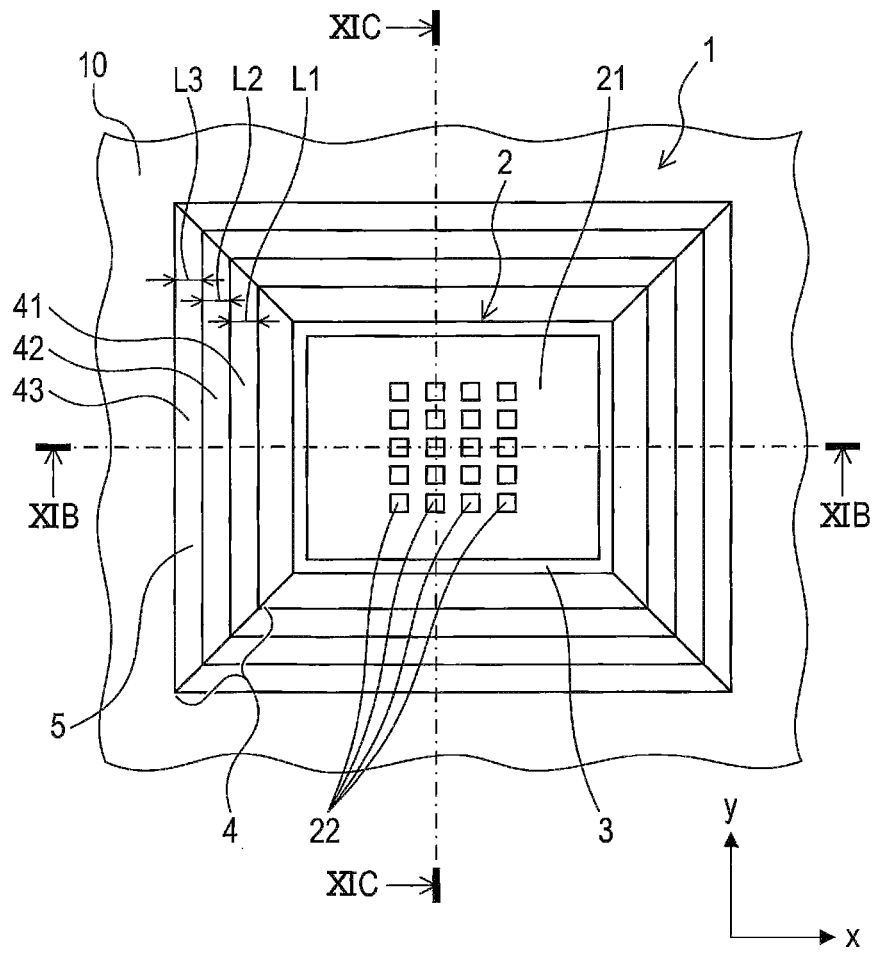
FIG. 11A shows a schematic view of a radar device according to a tenth modified example of the first embodiment.
Figure 11B:
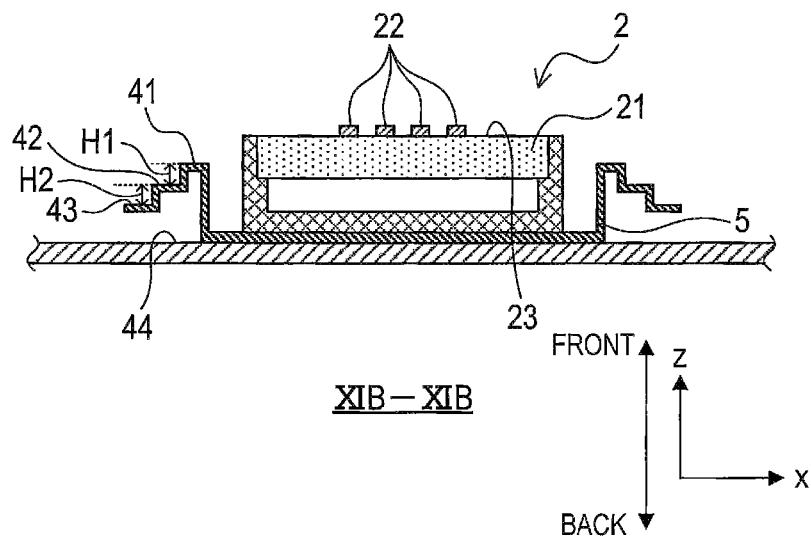
FIG. 11B shows a schematic sectional view taken along line XIB-XIB in FIG. 11A.

Next, a tenth modified example of the first embodiment is described with reference to FIG. 11.

In the first embodiment, the two radio wave reflectors 4 are disposed on opposite sides of the antenna unit 2 along the x-axis direction. In the present tenth modified example, however, four radio wave reflectors 4 are disposed. That is, both the x-axis direction and the y-axis direction in the drawing are azimuth detection directions, and the radio wave reflectors 4 are disposed on opposite sides of the antenna unit 2 along the x-axis direction and the y-axis direction in one-to-one correspondence and are thus disposed so as to surround the outer periphery of the antenna unit 2. The two radio wave reflectors 4 in the y-axis direction have shapes that are symmetric in the azimuth detection direction.

The first metal surface 41, the second metal surface 42, and the third metal surface 43 of the radio wave reflectors 4 in the y-axis direction are formed so as to be substantially parallel with the y-axis in the drawing. In addition, the shape, the width, and the differences of height with respect to the installation surface 44 of the metal surfaces 41, 42, and 43 are the same as those of the metal surfaces 41, 42, and 43 of the radio wave reflectors 4 in the x-axis direction.

[1-2. Functions and Effects]

In the radar device 1 configured as described above, most of the unnecessary waves that are radio waves emitted from the antenna unit 2 and travelling toward the outside of the detection area are reflected on the first metal surface 41, the second metal surface 42, and the third metal surface 43 of the radio wave reflector 4. Due to this reflection, the phases of these unnecessary waves can be dispersed. Particularly, the lengths L1, L2, and L3 of the metal surfaces in the radio wave reflector 4 are each shorter than one wavelength of the radio waves, and therefore reflected waves having the same phase are never generated. In addition, the differences H1 and H2 of height with respect to the installation surface 44 between the metal surfaces of the radio wave reflector 4 each have a value other than a value obtained by multiplying one-half of wavelength of the radio waves by m. Therefore, the difference of path length of radio waves generated due to the differences of height between the metal surfaces 41, 42, and 43 has a value other than the positive integral multiple of the one wavelength of the radio waves, and the radio waves reflected on the metal surfaces 41, 42, and 43 thus generate phase shift.

The first embodiment heretofore described in detail exhibits the following effects.

(1-a) The radio wave reflector 4 that includes the first metal surface 41, the second metal surface 42, and the third metal surface 43 having different heights reflect unnecessary waves on the first metal surface 41, the second metal surface 42, and the third metal surface 43 and thus allows the phases of the reflected waves to be dispersed. Thus, the radio wave reflector 4 can reduce disturbance of phase caused by the reflected unnecessary waves interfering with the waves emitted from the radar. Accordingly, the azimuth detection errors of the radar can be reduced.

Figure 12:
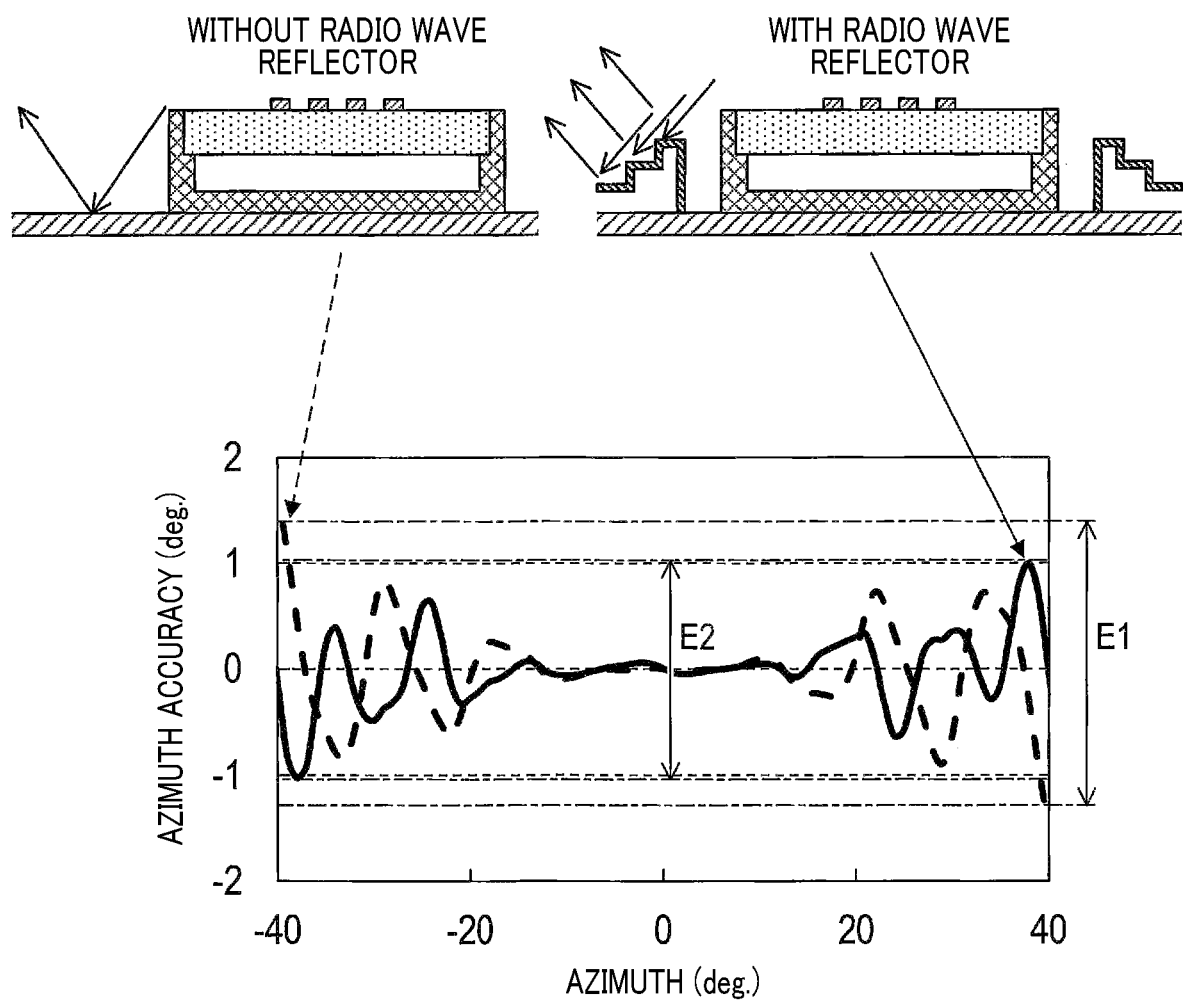
FIG. 12 shows diagrams and a graph that illustrate the effect of improving azimuth detection errors, the effect being achieved by the radar device according to the first embodiment.

FIG. 12 shows a result of measuring the azimuth detection accuracy of the radar device 1 including the radio wave reflectors 4 and a radar device including no radio wave reflector. As shown in the graph, the radar device including no radio wave reflector has an azimuth-accuracy maximum error E1 of about 1.5 degrees, whereas the radar device 1 including the radio wave reflectors 4 has an azimuth-accuracy maximum error E2 of about 1 degree. Accordingly, the azimuth detection accuracy has been improved.

Figure 13:
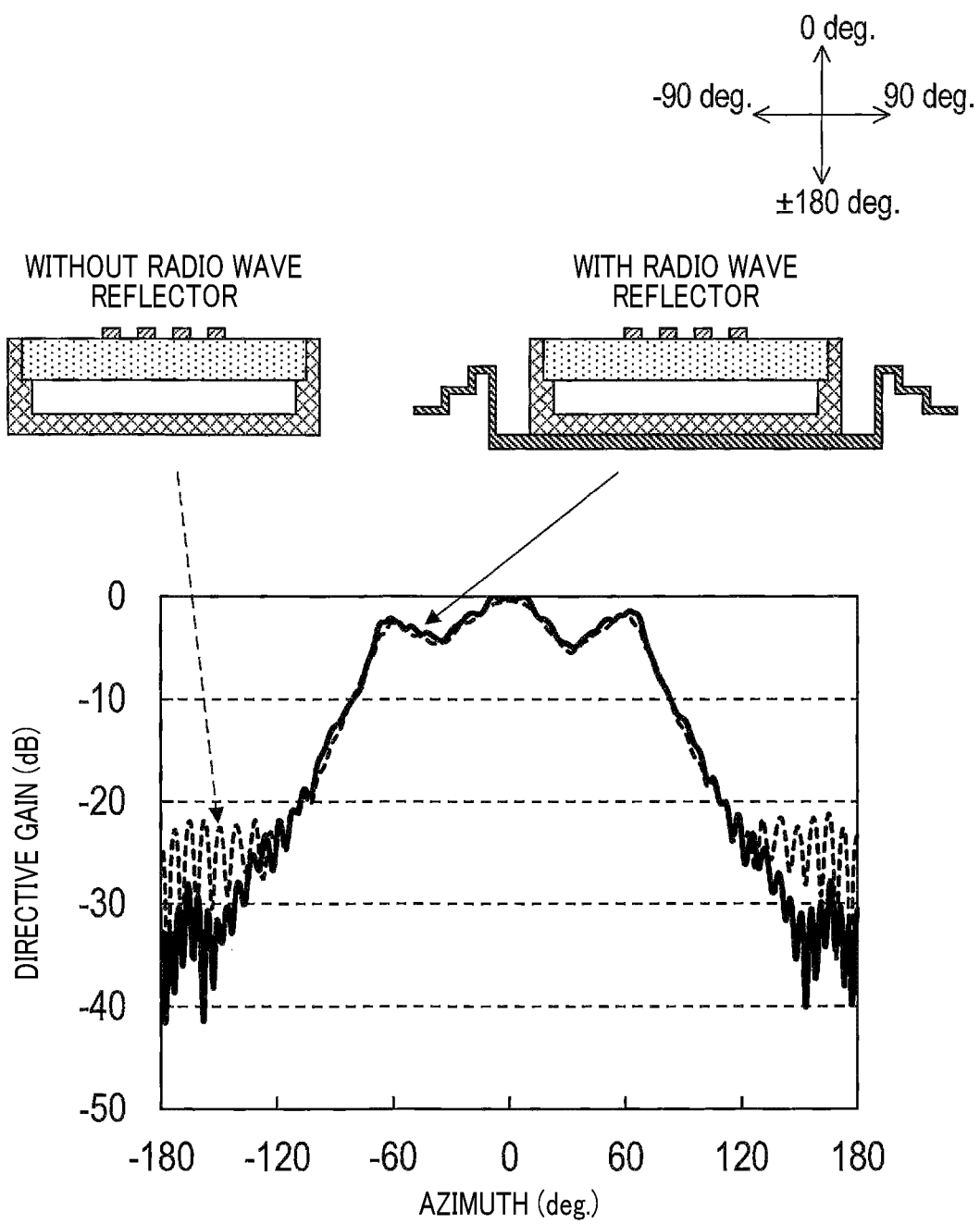
FIG. 13 shows diagrams and a graph that illustrate a change of antenna directivity of the radar device according to the first embodiment.

FIG. 13 shows a result of calculating the directive gain of the radar device 1 including the radio wave reflectors 4 and the radar device including no radio wave reflector by simulation. As shown in the graph, the radar device including the radio wave reflectors 4 has greatly decreased the gain outside the detection area compared to the radar device including no radio wave reflector.

(1b) The radar device 1 according to the present disclosure can reduce object detection errors of the radar without disposing a radio wave absorbing element or the like. Therefore, it is possible to avoid an increase of the production costs by not providing the radio wave absorbing element or the like, thus enabling reducing the production costs.

2. Second Embodiment

[2-1. Configuration]

A second embodiment has the same basic configuration as that of the first embodiment, and therefore only differences are described below. The same symbol as in the first embodiment represents the identical component and is to be referred to preceding description.

A radar device 101 according to the second embodiment includes, as illustrated in FIG. 14, two radio wave reflectors 400 directly installed on the vehicle 10. These radio wave reflectors 400 are disposed on opposite sides of the antenna unit 2 along the x-axis direction in the drawing in one-to-one correspondence. The two radio wave reflectors 400 have shapes that are symmetric in the azimuth detection direction. Hereinafter, the configuration and the shape of the radio wave reflectors 400 are specifically described, focusing on one of the radio wave reflectors 4.

The radio wave reflector 400 includes a curved surface portion 401. The curved surface portion 401 is curved so as to have a height gradually changed with respect to the installation surface 44 of the radar device 101. Specifically, the curved surface portion 401 is curved so as to increase its height in the z-axis direction with distance from the antenna unit 2. This curved surface portion 401 functions as a reflection surface.

First Modified Example of Second Embodiment

Figure 15C:
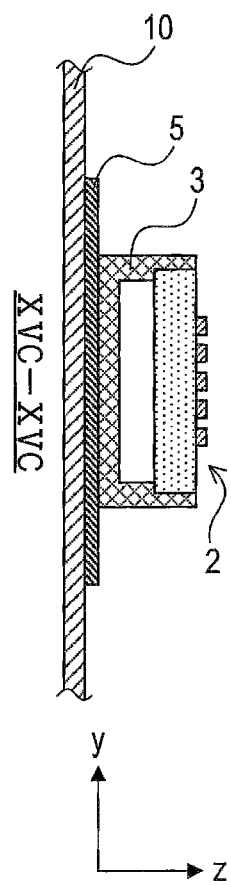
FIG. 15C shows a schematic sectional view taken along line XVC-XVC in FIG. 15A.
Figure 15A:
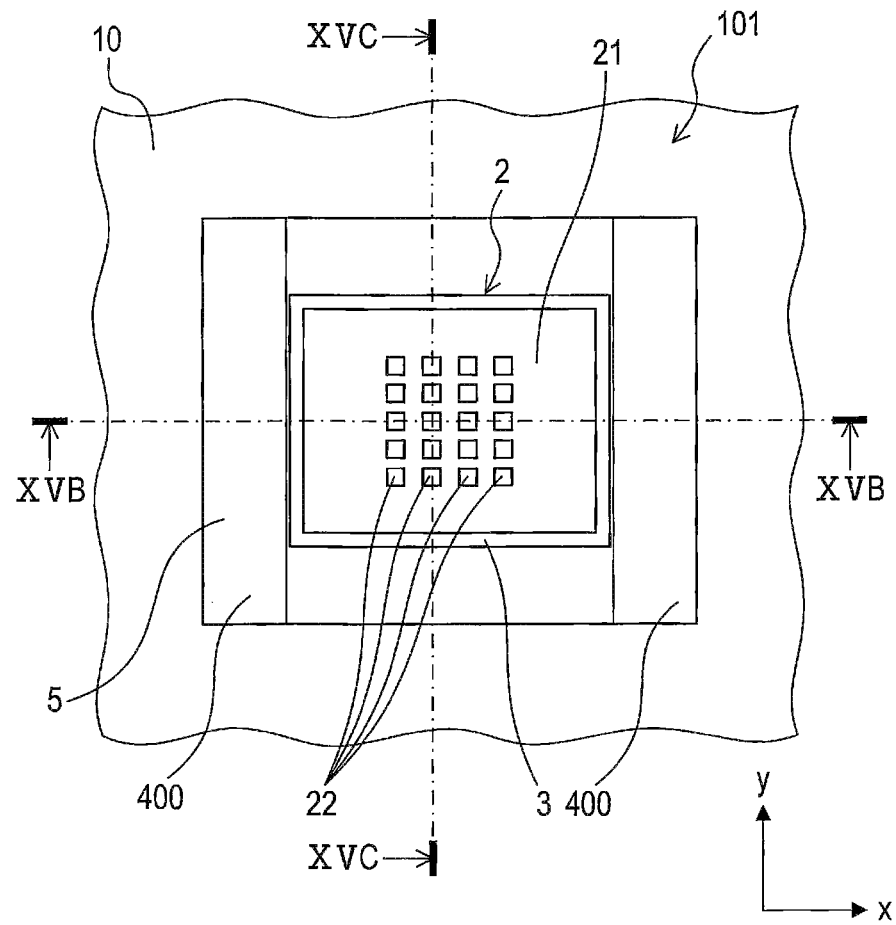
FIG. 15A shows a schematic view of a radar device according to a first modified example of the second embodiment.
Figure 15B:
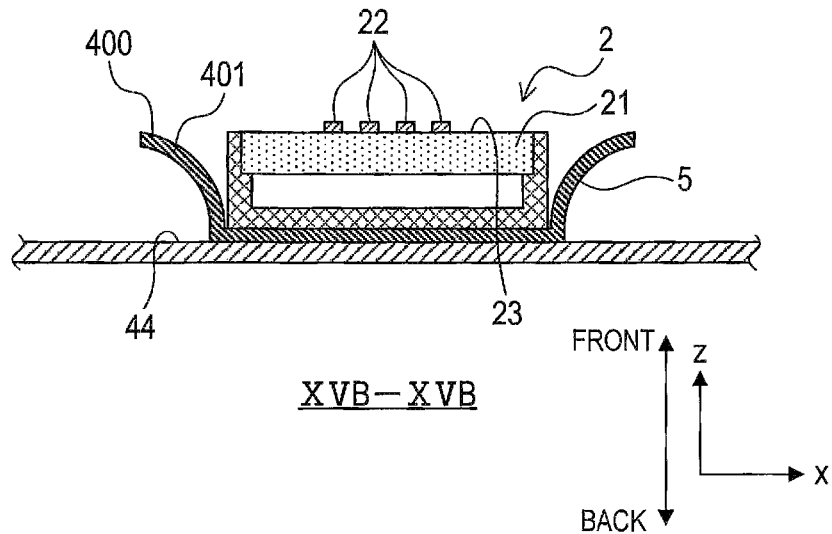
FIG. 15B shows a schematic sectional view taken along line XVB-XVB in FIG. 15A.

Next, a first modified example of the second embodiment is described with reference to FIG. 15. The present first modified example has the same basic configuration as that of the second embodiment, and identical symbols are assigned to common components. Hereinafter, differences are mainly described.

In the present first modified example, the radar device 101 includes a bracket 5 between the radar device 101 and the vehicle 10 in which the radar device 101 is installed. The bracket 5 is used for joining the radar device 101 to the vehicle 10. The bracket 5 is made from metal.

The radar device 101 is attached to the vehicle 10 with the bracket 5 interposed therebetween. Specifically, the radar device 101 may be attached to the bracket 5 that has been attached to the vehicle 10, or may be fixed to the vehicle 10 with the bracket 5 interposed between the radar device 101 and the vehicle 10.

The radio wave reflector 400 is integrally formed with the bracket 5 and can be formed through bending by pressing or the like.

The configuration of the curved surface portion 401 is the same as in the second embodiment.

Second Modified Example of Second Embodiment

Next, a second modified example of the second embodiment is described with reference to FIG. 16. The present second modified example has the same basic configuration as that of the second embodiment, and identical symbols are assigned to common components. Hereinafter, differences are mainly described.

The radio wave reflector 400 in the present second modified example is directly disposed on the housing 3 and is formed by bending the metal material upward from a contact point portion between each of both side surfaces in the x-axis direction of the housing 3 and the vehicle 10.

The housing 3 and the wave reflector 400 may be attached as separate components or may be integrally formed.

The configuration of the curved surface portion 401 is the same as in the second embodiment.

Third Modified Example of Second Embodiment

Next, a third modified example of the second embodiment is described with reference to FIG. 17. Modified examples 3 to 5 of the second embodiment described below have the same basic configuration as that of the first modified example of the second embodiment, and identical symbols are assigned to common components. Hereinafter, differences are mainly described.

The curved surface portion 401 of the radio wave reflector 400 in the present third modified example is configured to have a height gradually changed with respect to the installation surface 44 along the direction substantially parallel with the installation surface 44 and substantially vertical to the azimuth detection direction. Specifically, the curved surface portion 401 of the radio wave reflector 400 is configured to have a hemispherical shape along the y-axis direction.

Fourth Modified Example of Second Embodiment

Figure 18C:
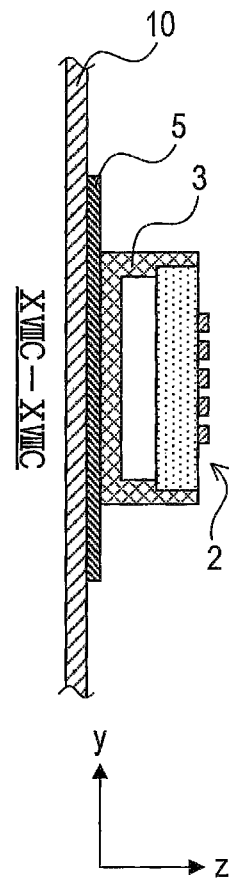
FIG. 18C shows a schematic sectional view taken along line XVIIIC-XVIIIC in FIG. 18A.
Figure 18A:
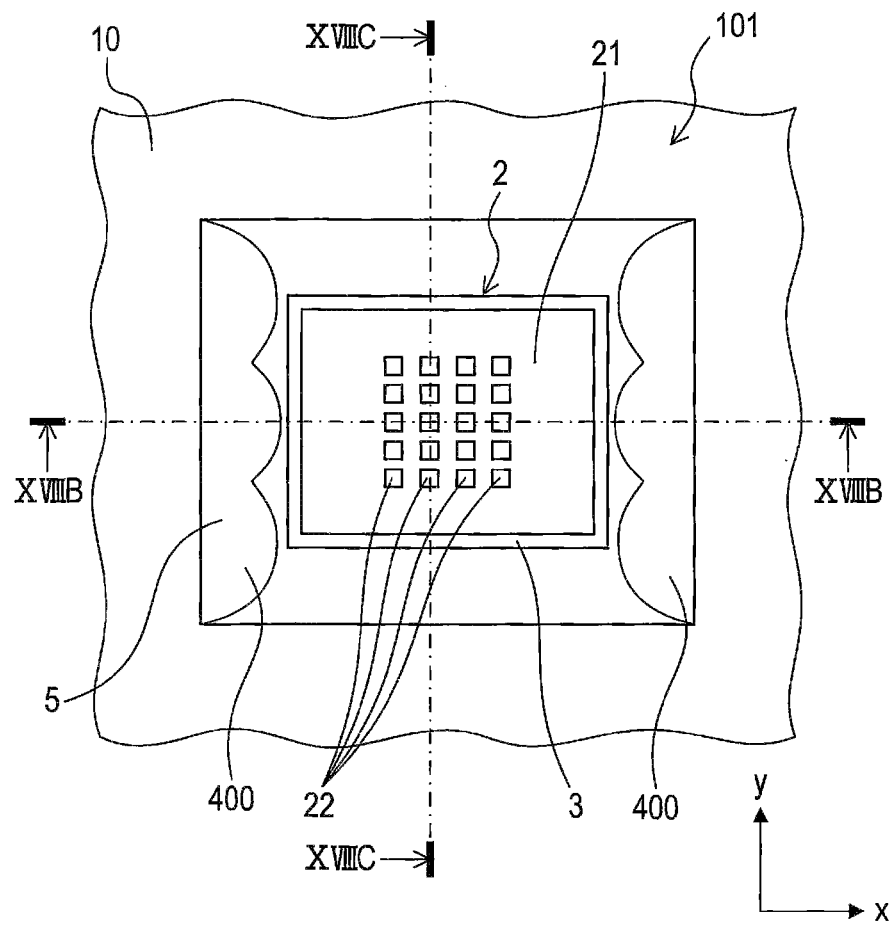
FIG. 18A shows a schematic view of a radar device according to a fourth modified example of the second embodiment.
Figure 18B:
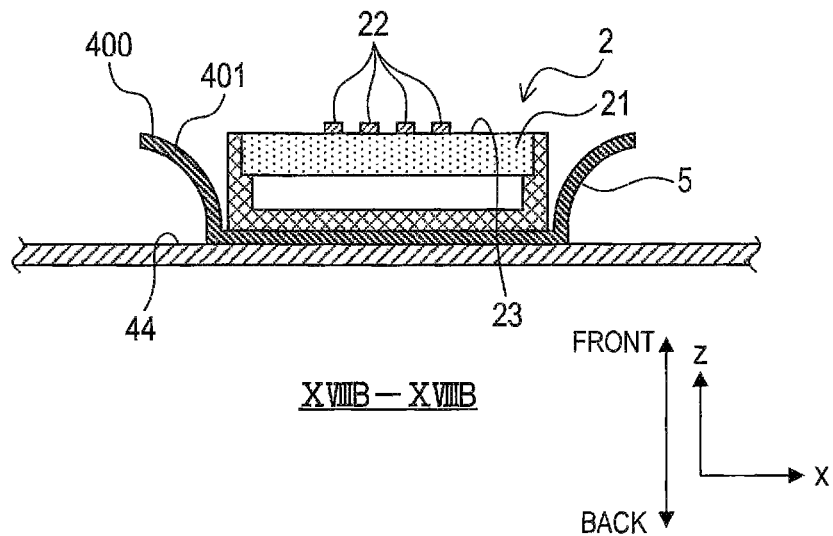
FIG. 18B shows a schematic sectional view taken along line XVIIIB-XVIIIB in FIG. 18A.

Next, a fourth modified example of the second embodiment is described with reference to FIG. 18.

The curved surface portion 401 of the radio wave reflector 400 in the present fourth modified example is configured to have a height gradually changed with respect to the installation surface 44 along the direction substantially parallel with the installation surface 44 and substantially vertical to the azimuth detection direction. Specifically, the curved surface portion 401 of the radio wave reflector 400 is configured to have a shape of three hemispheres connected, with parts of the outer surfaces of the hemispheres overlapping each other.

Fifth Modified Example of Second Embodiment

Next, a fifth modified example of the second embodiment is described with reference to FIG. 19.

In the second embodiment, the two radio wave reflectors 400 are disposed on opposite sides of the antenna unit 2 along the x-axis direction. In the present fifth modified example, however, four radio wave reflectors 400 are present. That is, the radio wave reflectors 400 are disposed on opposite sides of the antenna unit 2 along the x-axis direction and the y-axis direction in one-to-one correspondence and are thus disposed so as to surround the outer periphery of the antenna unit 2. The two radio wave reflectors 4 in the y-axis direction have shapes that are symmetric in the azimuth detection direction.

The shape and the curvature (that is, the degree of curve) of the curved surface portions 401 in the y-axis direction are identical to those of the curved surface portions 401 in the x-axis direction.

[2-2. Functions and Effects]

Most of the unnecessary waves that are radio waves emitted from the antenna unit 2 and travelling toward the outside of the detection area are reflected on the curved surface portion 401 of the radio wave reflector 400. Due to this reflection, the phases of these unnecessary waves can be dispersed.

The second embodiment heretofore described in detail exhibits the following effects.

(2-a) The radio wave reflector 400 reflects unnecessary waves on the curved surface portion 401 thereof, and thus allows the phase of each reflected wave to be diffused and enables reducing disturbance of phase caused by the reflected unnecessary waves interfering with the waves emitted from the radar. Accordingly, the azimuth detection errors of the radar can be reduced.

Figure 20:
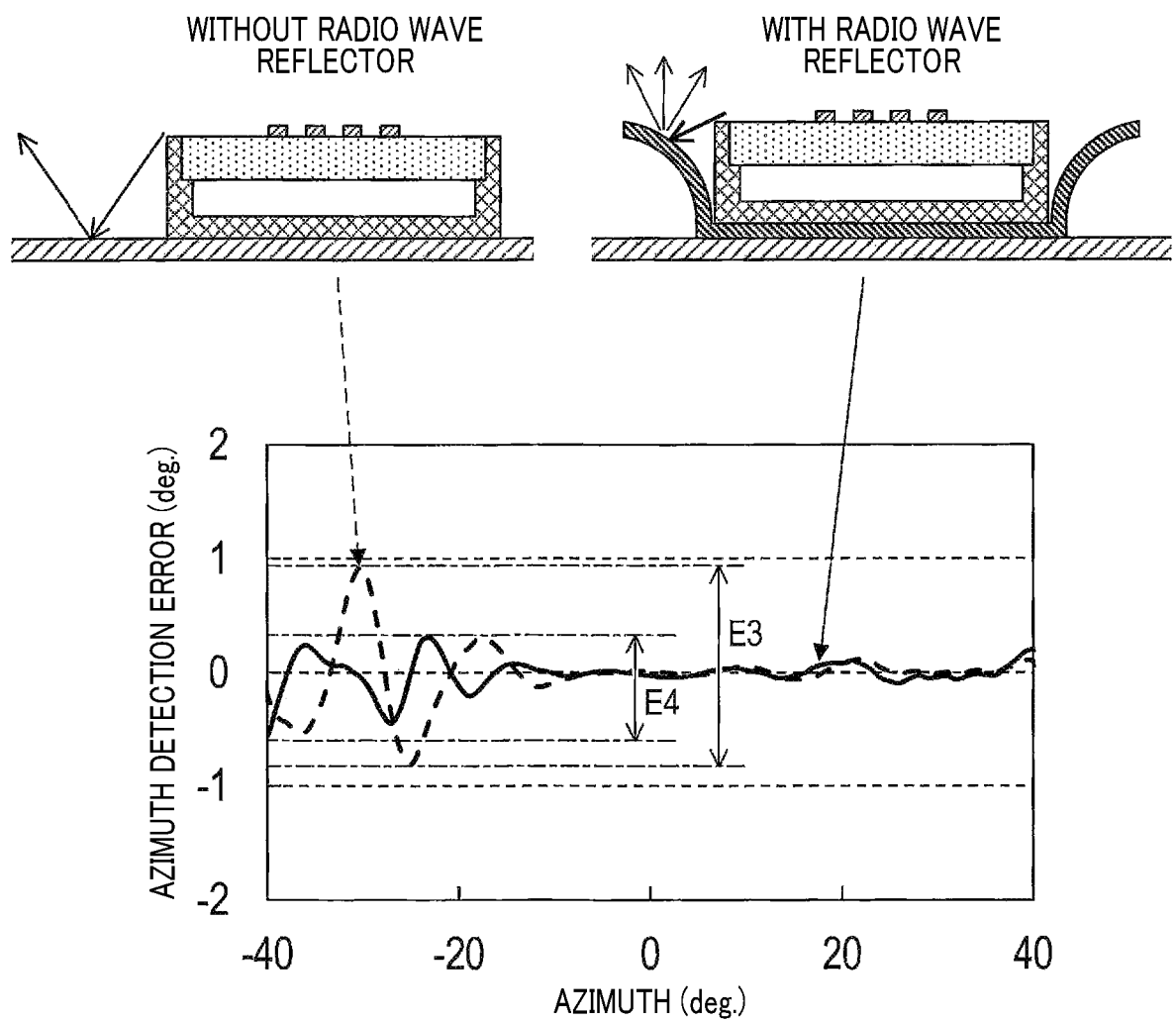
FIG. 20 shows diagrams and a graph that illustrate the effect of improving azimuth detection errors, the effect being achieved by the radar device according to the second embodiment.

FIG. 20 shows a result of measuring the azimuth detection accuracy of the radar device 101 including the radio wave reflectors 400 and a radar device including no radio wave reflector. As shown in the graph, the radar device including no radio wave reflector has an azimuth-accuracy maximum error E3 of about 1 degree, whereas the radar device 101 including the radio wave reflectors 4 has an azimuth-accuracy maximum error E4 of about 0.5 degrees. Accordingly, the azimuth detection accuracy has been improved.

Figure 21:
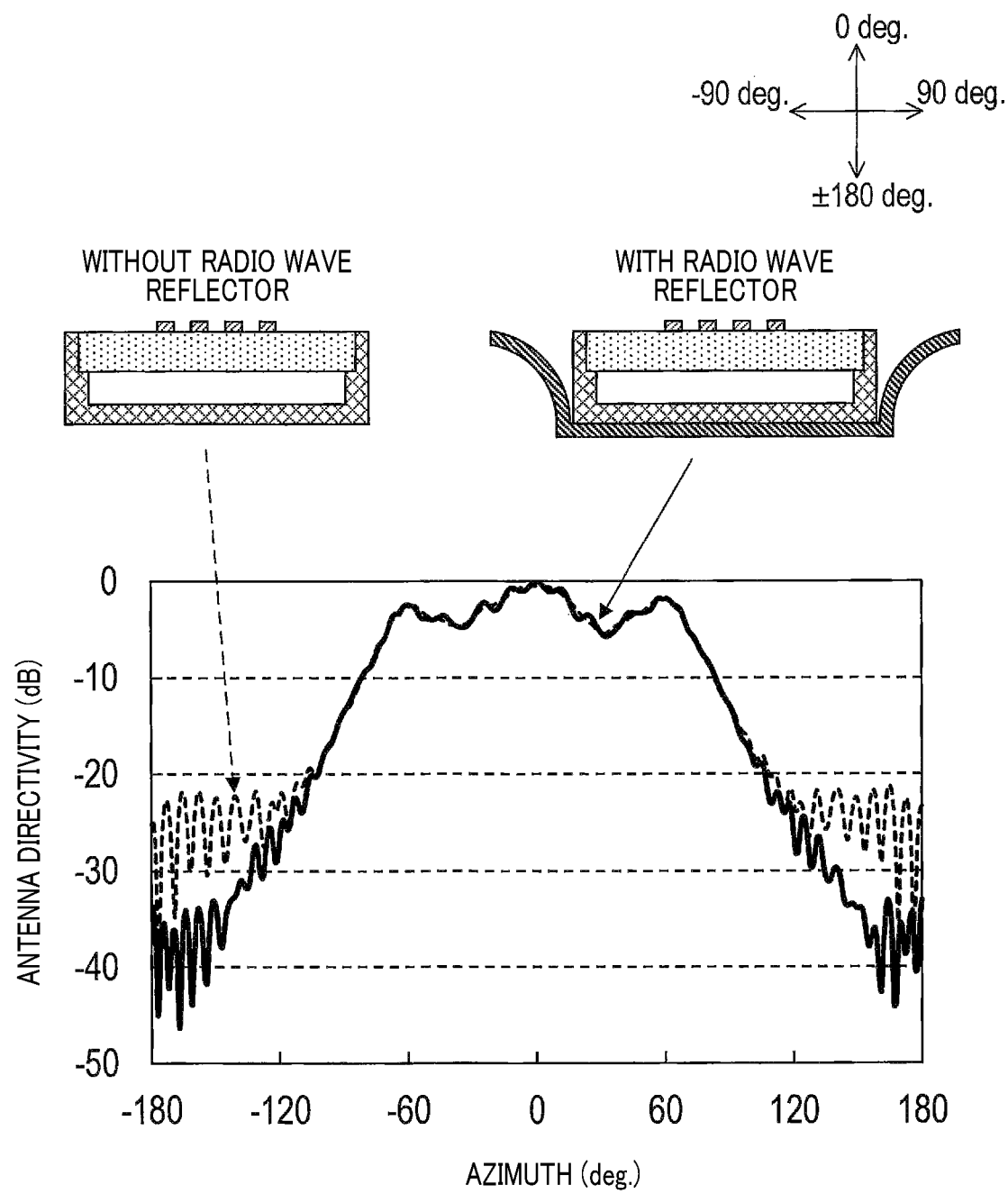
FIG. 21 shows diagrams and a graph that illustrate a change of antenna directivity of the radar device according to the second embodiment.

FIG. 21 shows a result of calculating the directive gain of the radar device 101 including the radio wave reflectors 400 and the radar device including no radio wave reflector by simulation. As shown in the graph, the radar device 101 including the radio wave reflectors 400 has greatly decreased the gain outside the detection area compared to the radar device including no radio wave reflector.

(2b) The radar device 101 can, similarly to the first embodiment, reduce object detection errors of the radar without disposing a radio wave absorbing element or the like. Therefore, it is possible to avoid an increase of the production costs by not providing the radio wave absorbing element or the like.

3. Other Embodiments

The embodiments of the present disclosure have heretofore been described. The present disclosure, however, is not limited to the embodiments described above and can be implemented with various modifications.

(3a) In the above embodiment, the number of metal surfaces in the radio wave reflector is 3, but the number of metal surfaces in the radio wave reflector is not limited to 3.

In addition, the installation location of the radio wave reflectors does not necessarily have to be in the azimuth detection direction, and the radio wave reflectors do not necessarily have to be disposed at positions opposite to each other.

(3b) The above embodiments showed examples of the configuration in which the whole of the radio wave reflector is disposed in the region S, but the configuration of the radio wave reflector is not limited to these examples. For example, a part of the radio wave reflector may be disposed in the region S.

(3c) In the present disclosure, the radar device including the radio wave reflectors has been described. The present disclosure, however, may be a single bracket including the radio wave reflectors. This aspect enables the bracket to singly exhibit the same effects as the effects described above.

(3d) A plurality of functions possessed by one constituent element in the above embodiments may be achieved by a plurality of constituent elements, or one function possessed by one constituent element may be achieved by a plurality of constituent elements. In addition, a plurality of functions possessed by a plurality of constituent elements may be achieved by one constituent element, or one function achieved by a plurality of constituent elements may be achieved by one constituent element. Further, a part of the configuration in the above embodiments may be omitted. Alternatively, at least a part of the configuration of one embodiment described above may be added to or replace the configuration of the other embodiment.

What is claimed is:

1. A radar device configured to emit radio waves and detects an object present in a prescribed detection region, the radar device comprising:

an antenna unit configured to emit the radio waves; and a radio wave reflector that is disposed in a region around the antenna unit and outside the prescribed detection region and that includes a reflection surface disposed on an installation surface of the radar device, wherein:

the reflection surface includes a plurality of metal surfaces having heights that are different from each other with respect to the installation surface, the heights corresponding to a perpendicular distance away from the installation surface;

each metal surface of the plurality of metal surfaces is disposed to run lengthwise along a direction substantially perpendicular to the azimuth detection direction; and the reflection surface is disposed such that an azimuth detection direction intersects with the reflection surface.

2. The radar device according to claim 1, wherein when among the radio waves emitted from the antenna unit, radio waves emitted to an outside of the prescribed detection region are defined as unnecessary waves, a length from one end to another end in the azimuth detection direction of each of the plurality of metal surfaces is shorter than one wavelength of the unnecessary waves.

3. The radar device according to claim 1, wherein the plurality of metal surfaces have, as differences of height with respect to the installation surface, a value other than a value obtained by multiplying one-half of wavelength of the radio waves by a positive integer m.

4. The radar device according to claim 1, wherein
the plurality of metal surfaces are formed such that the height of the reflection surface varies in steps with respect to the installation surface along the azimuth detection direction.

5. The radar device according to claim 1, wherein
at least one of the plurality of metal surfaces is configured to have a height that varies with respect to the installation surface along the direction substantially perpendicular to the azimuth detection direction.

6. The radar device according to claim 1, wherein
the reflection surface has a curved surface shape.

7. The radar device according to claim 6, wherein
the curved surface shape is configured to have a height that varies with respect to the installation surface along the direction substantially perpendicular to the azimuth detection direction.

8. The radar device according to claim 1, wherein
at least a part of the radio wave reflector is present in a region that includes a first region and a second region, wherein:
the first region overlaps the second region,
the first region is defined as being between:
a first line that runs substantially perpendicular to the installation surface along a side wall of the antenna unit in the azimuth detection direction,
and a second line:
that intersects with the first line at an angle of about 60° or less at an upper end portion of the side wall, the upper end portion being opposite the installation surface in a direction substantially perpendicular to the installation surface, and
that runs from the upper end portion of the side wall toward the installation surface, and
the second region has a length within three wavelengths of the radio waves along the azimuth detection direction extending from the upper end portion.

9. A bracket for attaching the radar device according to claim 1 to a vehicle, the bracket comprising:
the radio wave reflector being, in attachment of the radar device.

* * * * *